(12) United States Patent
Anderson et al.

(10) Patent No.: US 7,364,642 B2
(45) Date of Patent: Apr. 29, 2008

(54) RECYCLING OF LATEX-CONTAINING BROKE

(75) Inventors: Ralph Anderson, Marietta, GA (US); William A. Wengeler, Marinette, WI (US); Tammy Thompson, Austin, TX (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 134 days.

(21) Appl. No.: 10/643,014

(22) Filed: Aug. 18, 2003

(65) Prior Publication Data

US 2005/0039868 A1 Feb. 24, 2005

(51) Int. Cl.
*D21C 5/02* (2006.01)
*D21B 1/08* (2006.01)

(52) U.S. Cl. ............ 162/191; 162/4; 162/13; 162/20; 162/189; 241/21

(58) Field of Classification Search ............ 162/4, 162/191, 55, 111, 125, 169, 158, 13, 20, 18, 162/9; 241/21, 4
See application file for complete search history.

(56) References Cited

U.S. PATENT DOCUMENTS

| | | | |
|---|---|---|---|
| 1,422,251 A | 7/1922 | Billingham | |
| 2,697,661 A | 12/1954 | Hollis | |
| 2,889,242 A | 6/1959 | Teichmann | |
| 2,977,274 A | 3/1961 | Hollis | |
| 3,057,769 A | 10/1962 | Sandberg | |
| 3,154,255 A * | 10/1964 | Schulman et al. | 241/14 |
| 3,245,868 A * | 4/1966 | Espenmiller et al. | 162/7 |
| 3,250,666 A * | 5/1966 | Clark et al. | 162/169 |
| 3,260,778 A | 7/1966 | Walton | |
| 3,644,170 A | 2/1972 | Mekata et al. | |
| 3,773,613 A | 11/1973 | Lee et al. | |

(Continued)

FOREIGN PATENT DOCUMENTS

AU B 2961592 8/1993

(Continued)

OTHER PUBLICATIONS

Webster's Third New International® Dictionary, Unabridged, 1993, Merriam-Webster, Incorporated.*

(Continued)

*Primary Examiner*—Steven P. Griffin
*Assistant Examiner*—Dennis Cordray
(74) *Attorney, Agent, or Firm*—Dority & Manning, P.A.

(57) ABSTRACT

Methods for recycling latex-containing broke are generally provided. Specifically, mechanical treatment may be employed to rework latex-containing broke for reuse in various products without the need for treatment with chemicals, such as hypochlorite, chlorine, or hypochlorous acid. As a result of mechanical treatment, fiber aggregates are formed that have a relatively small size. For instance, a large portion of the resulting fiber aggregates may be relatively free from the latex polymer. Specifically, the fiber aggregates can contain a "core" of latex from which extend short fibers and/or fragments that are uncoated with the latex. The result is fiber aggregates that are uniquely "partially coated" with a latex polymer. When recycled in paper products, these fiber aggregates may impart a variety of benefits, such as increased bulk retention and high water capacity without any loss in absorbency rate.

42 Claims, 13 Drawing Sheets

U.S. PATENT DOCUMENTS

| | | | |
|---|---|---|---|
| 3,785,920 A | 1/1974 | Johansen | |
| 3,791,917 A | 2/1974 | Bolton, III | |
| 3,844,880 A | 10/1974 | Meisel, Jr. et al. | |
| 3,879,257 A * | 4/1975 | Gentile et al. | 162/112 |
| 3,939,066 A | 2/1976 | Bauer | |
| 4,050,899 A | 9/1977 | Grube et al. | |
| 4,100,016 A | 7/1978 | Diebold et al. | |
| 4,163,687 A | 8/1979 | Mamers et al. | |
| 4,235,707 A | 11/1980 | Burke, Jr. | |
| 4,261,836 A | 4/1981 | Koglin | |
| 4,303,019 A | 12/1981 | Haataja et al. | |
| 4,312,701 A | 1/1982 | Campbell | |
| 4,365,761 A * | 12/1982 | Danforth | 241/21 |
| 4,461,648 A | 7/1984 | Foody | |
| 4,482,095 A | 11/1984 | Danforth | |
| 4,529,480 A | 7/1985 | Trokhan | |
| 4,540,467 A | 9/1985 | Grube et al. | |
| 4,560,527 A * | 12/1985 | Harke et al. | 264/500 |
| 4,600,545 A | 7/1986 | Galli et al. | |
| 4,615,767 A | 10/1986 | Miers et al. | |
| 4,645,541 A | 2/1987 | DeLong | |
| 4,668,339 A | 5/1987 | Terry | |
| 4,699,691 A | 10/1987 | Villavicencio | |
| 4,722,964 A | 2/1988 | Chan et al. | |
| 4,735,682 A * | 4/1988 | Didwania et al. | 162/8 |
| 4,751,034 A | 6/1988 | DeLong et al. | |
| 4,798,651 A | 1/1989 | Kokta | |
| 4,867,383 A | 9/1989 | Terry et al. | |
| 4,897,155 A | 1/1990 | Koteles | |
| 4,919,877 A | 4/1990 | Parsons et al. | |
| 4,934,608 A | 6/1990 | Sylla et al. | |
| 4,983,258 A | 1/1991 | Maxham | |
| 5,002,633 A | 3/1991 | Maxham | |
| 5,011,091 A | 4/1991 | Kopecky | |
| 5,011,741 A | 4/1991 | Hoffman | |
| 5,022,984 A | 6/1991 | Pimley et al. | |
| 5,059,280 A | 10/1991 | Thompson et al. | |
| 5,102,501 A | 4/1992 | Eber et al. | |
| 5,102,606 A | 4/1992 | Ake et al. | |
| 5,114,540 A | 5/1992 | Law | |
| 5,122,228 A | 6/1992 | Bouchette et al. | |
| 5,129,988 A | 7/1992 | Farrington, Jr. | |
| 5,133,832 A | 7/1992 | Gilkey | |
| 5,133,833 A * | 7/1992 | Weber et al. | 162/8 |
| 5,137,599 A | 8/1992 | Maxham | |
| 5,139,616 A * | 8/1992 | Ling | 162/147 |
| 5,215,625 A | 6/1993 | Burton | |
| 5,217,576 A | 6/1993 | Van Phan | |
| 5,262,003 A | 11/1993 | Chupka et al. | |
| 5,262,004 A | 11/1993 | Gilbert et al. | |
| 5,277,758 A * | 1/1994 | Brooks et al. | 162/4 |
| 5,332,474 A | 7/1994 | Maxham | |
| 5,344,573 A | 9/1994 | Hill et al. | |
| 5,401,361 A | 3/1995 | Prough et al. | |
| 5,401,810 A | 3/1995 | Jansma et al. | |
| 5,429,310 A | 7/1995 | Keller et al. | |
| 5,478,441 A | 12/1995 | Hamilton | |
| 5,494,554 A | 2/1996 | Edwards et al. | |
| 5,496,441 A | 3/1996 | Tran | |
| 5,498,232 A | 3/1996 | Scholz | |
| 5,527,432 A | 6/1996 | Leuthold et al. | |
| 5,573,640 A | 11/1996 | Frederick et al. | |
| 5,582,681 A | 12/1996 | Back et al. | |
| 5,639,346 A * | 6/1997 | Marwah et al. | 162/5 |
| 5,643,413 A * | 7/1997 | Hoffman | 162/125 |
| 5,674,360 A | 10/1997 | Wyllie | |
| 5,690,789 A * | 11/1997 | Small et al. | 162/134 |
| 5,755,926 A | 5/1998 | Hankins et al. | |
| 5,858,021 A | 1/1999 | Sun et al. | |
| 5,972,039 A | 10/1999 | Honeycutt et al. | |
| 5,989,682 A | 11/1999 | Anderson | |
| 6,001,218 A | 12/1999 | Hsu et al. | |
| 6,027,610 A | 2/2000 | Back et al. | |
| 6,053,441 A | 4/2000 | Danforth et al. | |
| 6,071,380 A | 6/2000 | Hoffman | |
| 6,074,527 A | 6/2000 | Hsu et al. | |
| 6,120,640 A | 9/2000 | Shih et al. | |
| 6,120,642 A | 9/2000 | Lindsay et al. | |
| 6,273,999 B1 * | 8/2001 | Jorn | 162/191 |
| 6,296,736 B1 | 10/2001 | Hsu et al. | |
| 6,302,342 B1 * | 10/2001 | Danforth et al. | 241/21 |
| 6,315,864 B2 | 11/2001 | Anderson et al. | |
| 6,372,085 B1 | 4/2002 | Hsu et al. | |
| 6,387,210 B1 | 5/2002 | Hsu et al. | |
| 6,413,363 B1 | 7/2002 | Hsu et al. | |
| 6,419,787 B2 | 7/2002 | Goulet et al. | |
| 6,500,289 B2 | 12/2002 | Merker et al. | |
| 6,541,099 B1 * | 4/2003 | Merker et al. | 428/194 |
| 6,835,282 B2 * | 12/2004 | Harvey et al. | 162/147 |
| 2001/0031595 A1 * | 10/2001 | Anderson et al. | 442/381 |
| 2002/0162635 A1 | 11/2002 | Hsu et al. | |
| 2003/0118776 A1 | 6/2003 | Anderson et al. | |

FOREIGN PATENT DOCUMENTS

| | | |
|---|---|---|
| CA | 564700 | 10/1958 |
| EP | 0557651 A1 | 9/1993 |
| GB | 476569 | 12/1937 |
| WO | WO 9600811 A1 | 1/1996 |
| WO | WO 9715711 A2 | 5/1997 |
| WO | WO 9715711 A3 | 5/1997 |
| WO | WO 9723184 A1 | 7/1997 |
| WO | WO 9823813 A1 | 6/1998 |
| WO | WO 9827269 A1 | 6/1998 |

OTHER PUBLICATIONS

Abstract of SU Patent No. 14374501A1 as well as copy of patent, Mar. 30, 1987.

Abstract of JP Patent No. 4-73281 as well as copy of patent, Mar. 9, 1992.

Article—*The Chemistry of Wet-Strength Broke Repulping*, Herbert H. Espy, Hercules, Inc., Progress in Paper Recycling, Aug. 1992, pp. 17-23.

* cited by examiner

RECYCLING OF LATEX-CONTAINING BROKE

BACKGROUND OF THE INVENTION

During the production of paper products, significant amounts of scrap material are accumulated. This waste product, also known as broke, is generated from recycled products, products that do not fall within manufacturer's specifications, or from excess remaining after completion of the finished product. Problems have been experienced in the past, however, in recycling the paper fibers contained in many types of broke. For instance, prior to using broke for making a commercial towel, wiper or other similar product, it is often necessary to treat the fiber source to chemically degrade unwanted chemical constituents that might adversely affect the quality of the recycled paper product. One notable example of a contaminant that must be removed from broke before it can be recycled is latex. Latex is used as a creping adhesive in many papermaking processes, and is typically applied at high levels to one surface (e.g., single re-creped (SRC)) or both surfaces (e.g., double re-creped (DRC)) of the paper product.

Historically, latex-containing broke is broken down and recycled using chemical treatments. The purpose of the chemical treatments is to aid in degrading the latex polymer so that the mechanical action of the pulper may degrade the paper into individual fibers suitable for recycle in other products. One such chemical treatment includes treating the broke with hypochlorite, chlorine, or hypochlorous acid, depending on reaction conditions in the hydrapulper, to chemically oxidize the latex and thus allow the paper to be further broken down by the shearing and mechanical action of the pulper. The disadvantages of this process include high costs, potential chloroform generation, loss of brightness on unbleached fiber, and increased potential for corrosion of the paper machine.

Another chemical process entails treatment of the fiber with caustic and high temperature to swell the latex structure so that the mechanical action of the hydrapulper can defiberize the sheet. Although this process may sometimes be effective on unbleached grades of fiber, the disadvantages of this procedure are the need for heating the pulpers and the handling of caustic treatments. Caustic treatments may also darken the fibers. Finally, a third chemical process for repulping latex-containing broke includes treating the broke with persulfate salts. As with the other chemical procedures, the treatment with persulfate salts possesses disadvantages such as the need to neutralize residual persulfate, the need for pH and temperature adjustment, and the high cost of chemicals.

Accordingly, a need exists for an improved method of recycling latex-containing broke without chemical treatments, particularly those containing high levels of latex.

SUMMARY OF THE INVENTION

In accordance with one embodiment of the present invention, a method for recycling broke containing cellulosic fibers and a latex polymer is disclosed. The latex polymer may be selected from the group consisting of styrene butadiene, neoprene, polyvinyl chloride, vinyl copolymers, polyamides, ethylene vinyl terpolymers, acrylates, methacrylates, and combinations thereof. The latex polymer may also comprise from about 1% to about 60% by weight of the broke, and in some embodiments, from about 10% to about 40% by weight of the broke.

The broke may originate from any of a variety of different sources. For example, in one embodiment, the broke is derived from a product that comprises a multi-layered paper web. One or more surfaces of the product may contain the latex polymer in a spaced-apart pattern. In such instances, the latex polymer may cover from about 10% to about 70% of the surface, and in some embodiments, from about 25% to about 50% of the surface. If desired, the surface of the product may be creped, such as when the latex polymer is used as a creping adhesive.

Regardless of the source, the method for recycling the broke comprises mechanically treating it to form fiber aggregates, wherein the fiber aggregates have an average size of less than about 12 millimeters, in some embodiments from about 0.5 to about 6 millimeters, and in some embodiments, from about 1 to about 4 millimeters. The fiber aggregates contain a first portion coated with the latex polymer and a second portion that remains relatively free from the latex polymer. For example, in some embodiments, the second portion constitutes 40% or more of the total area of the fiber aggregates, in some embodiments 50% or more of the total area of the fiber aggregates, and in some embodiments, 60% or more of the total area of the fiber aggregates. The fibers aggregates may also have a Canadian Standard Freeness value of from about 400 to about 800, and in some embodiments, from about 600 to about 750.

Although various mechanical treatments may be utilized, one embodiment of the present invention involves pulping the broke in a pulper. Prior to pulping, the broke may be diluted to a solids consistency of from about 4% to about 10%, and in some embodiments, from about 6% to about 8%. The pulper may be any type of pulper known in the art, such as a rotor/stator type pulper. Besides pulping, the broke may also be subjected to other mechanical treatments, such as refinement.

When processed according to the present invention, the latex-containing broke may be reused in a paper product to impart a variety of benefits. For instance, in one embodiment, the fiber aggregates are reused in a paper product that comprises a multi-layered paper web. For instance, the fiber aggregates may be incorporated into an inner layer of the multi-layered paper web. In such instances, the fiber aggregates may constitute less than about 60% by weight of the inner layer, and in some embodiments, from about 10% to about 50% by weight of the inner layer.

In accordance with another embodiment of the present invention, a paper product is disclosed that comprises recycled broke. The recycled broke contains cellulosic fibers and a latex polymer, and has an average size of less than about 12 millimeters. A first portion of the recycled broke is coated with the latex polymer, and a second portion remains relatively free from the latex polymer.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
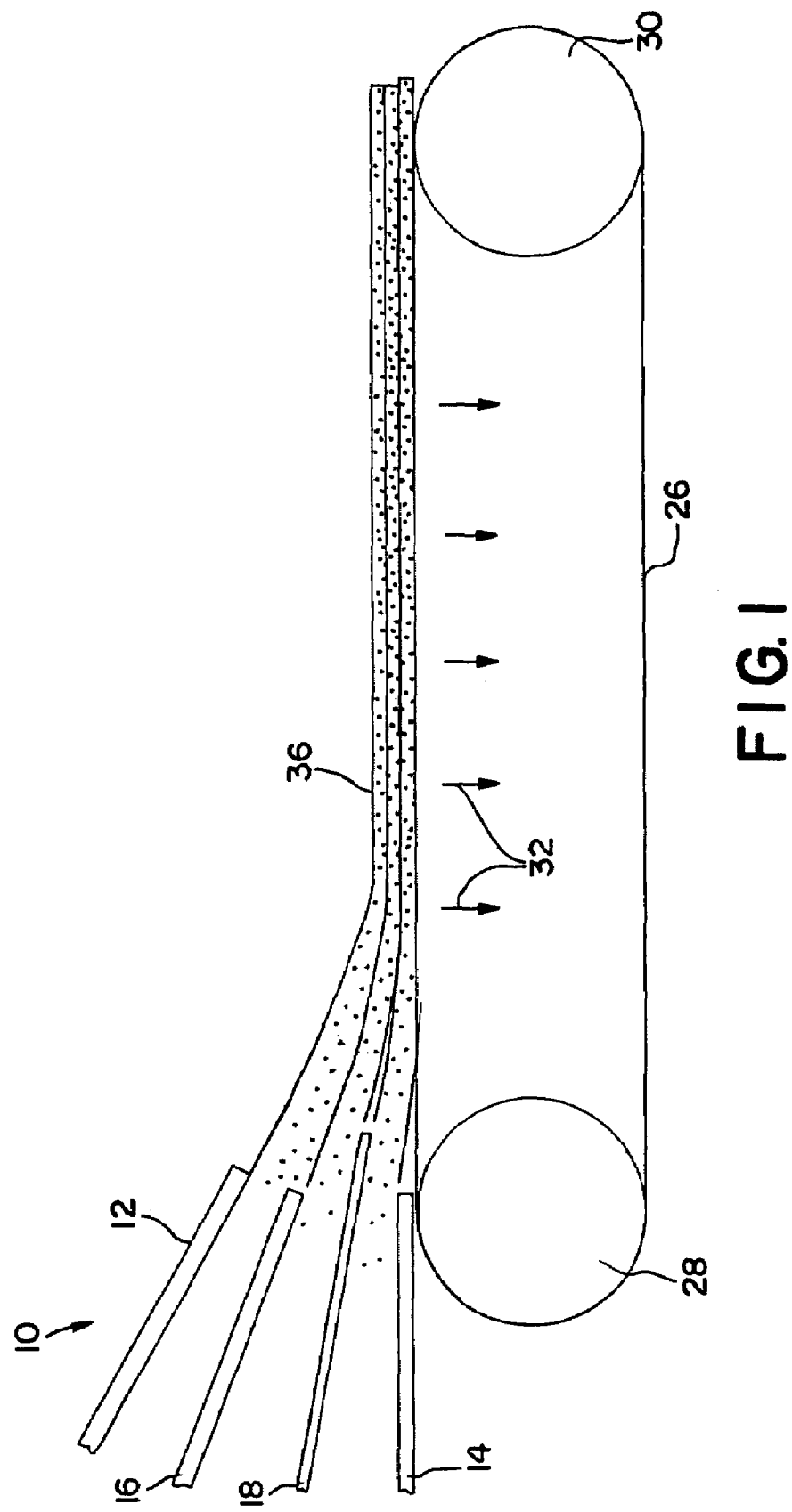
FIG. 1 is a schematic illustration of a multi-layered headbox that may be used to form a paper web in accordance with one embodiment of the present invention.

Repeat use of reference characters in the present specification and drawings is intended to represent same or analogous features or elements of the invention.

DETAILED DESCRIPTION OF THE REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Detailed Description

The present invention relates to a process for recycling latex-containing broke. Specifically, the present inventors have discovered that mechanical treatment may be employed to rework latex-containing broke for reuse in various products without the need for treatment with chemicals, such as hypochlorite, chlorine, or hypochlorous acid. As a result of mechanical treatment, fiber aggregates (e.g., one or more of short fibers, fiber fragments, and/or latex) are formed that have a relatively small size. Besides having a reduced size, the fiber aggregates have also been unexpectedly discovered to have other unique properties. For instance, a large portion of the resulting fiber aggregates may be relatively free from the latex polymer. Specifically, the fiber aggregates contain a "core" of latex from which extend short fibers and/or fragments that are uncoated with the latex. The result is fiber aggregates that are uniquely "partially coated" with a latex polymer. When recycled in paper products, these fiber aggregates may impart a variety of benefits, such as increased bulk retention and high water capacity without any loss in absorbency rate.

A. Source of Latex-Containing Broke

The broke used in the present invention may be derived from any of a variety of paper products, such as towels, tissues, wipers, napkins, etc., which includes waste materials generated during the manufacture of such products. In some embodiments, the broke may include cellulosic fibers (e.g., pulp, thermomechanical pulp, synthetic cellulosic fibers, modified cellulosic fibers, and so forth). Some examples of suitable cellulosic fiber sources include virgin wood fibers, such as thermomechanical, bleached and unbleached softwood and hardwood pulps. The pulp fibers may be high-average fiber length pulp, low-average fiber length pulp, or mixtures of the same. High-average fiber length pulp fibers may have an average fiber length from about 1.5 mm to about 6 mm. Some examples of such fibers may include, but are not limited to, northern softwood, southern softwood, redwood, red cedar, hemlock, pine (e.g., southern pines), spruce (e.g., black spruce), combinations thereof, and so forth. Exemplary high-average fiber length wood pulps include those available from the Kimberly-Clark Corporation under the trade designation "Longlac 19". The low-average fiber length pulp may be, for example, certain virgin hardwood pulps and secondary (i.e. recycled) fiber pulp from sources such as, for example, newsprint, recycled paperboard, and office waste. Hardwood fibers, such as eucalyptus, maple, birch, aspen, and so forth, may also be used. Low-average fiber length pulp fibers may have an average fiber length of less than about 1.2 mm, for example, from 0.7 mm to 1.2 mm. Mixtures of high-average fiber length and low-average fiber length pulps may contain a significant proportion of low-average fiber length pulps. For example, mixtures may contain more than about 50 percent by weight low-average fiber length pulp and less than about 50 percent by weight high-average fiber length pulp. One exemplary mixture contains 75% by weight low-average fiber length pulp and about 25% by weight high-average fiber length pulp.

Vegetable fibers, such as abaca, flax, milkweed, cotton, modified cotton, cotton linters, may also be used. In addition, synthetic fibers such as, for example, rayon and viscose rayon may be used. Modified cellulosic fibers may also be used. For example, the fibrous material may include derivatives of cellulose formed by substitution of appropriate radicals (e.g., carboxyl, alkyl, acetate, nitrate, etc.) for hydroxyl groups along the carbon chain.

One particular advantage of the present invention is the ability to recycle latex-containing broke. The latex polymer contained in the broke may include, but not limited to, styrene butadiene, neoprene, polyvinyl chloride, vinyl copolymers (e.g., vinyl acetates, vinyl chlorides, etc.), polyamides, ethylene vinyl terpolymers (e.g., ethyl vinyl acetate copolymer), acrylates, methacrylates, and combinations thereof. One particularly suitable latex polymer is an acrylic latex emulsion sold by Noveon, Inc. under the trade name HYCAR. Other commercially available latex polymers include HYCAR 2671, 26445, 26322, 26684, and 26469 from Noveon, Inc.; RHOPLEX B-15, HA-8 and NW-1715 from Rohm & Haas; BUTOFAN 4261 and STYRONAL 4574 from BASF of Chattanooga, Tenn. Still other suitable latex polymers may be described in U.S. Pat. No. 3,844,880 to Meisel, Jr., et al., which is incorporated herein in its entirety by reference thereto for all purposes.

The broke may contain the latex polymer at a level ranging from about 1% to about 60% by weight, in some embodiments from about 5% to about 50% by weight, in some embodiments from about 10% to about 40%, and in some embodiments, from about 10% to about 20% by weight, based upon the total weight of the broke. In some instances, even higher levels of a latex polymer may be accommodated by the present invention. Surprisingly, it has been discovered that broke containing large amounts of a latex polymer may still be recycled in accordance with the present invention without the use of polymer-reducing chemical treatments.

In one particular embodiment of the present invention, only certain regions of the broke contain the latex polymer. For example in some embodiments, the broke may be derived from a paper product that has one or more surfaces applied with a latex polymer in a spaced-apart pattern. In paper products having such a surface treatment, the latex polymer may, for instance, cover from about 5% to about 95%, in some embodiments from about 10% to about 70%, and in some embodiments, from about 25% to about 50% of a given surface of the paper product. The application pattern of the latex polymer may also vary. In one embodiment, for instance, the latex polymer is applied in a reticular pattern that is interconnected to form a net-like design. In another embodiment, the latex polymer is applied in a pattern that represents a succession of boat-shaped dots. The latex polymer may also penetrate from about 10% to about 50%, and in some embodiments, from about 25% to about 40% into the interior of the paper product based on its total thickness, although there may be greater or less latex penetration at some locations.

As indicated above, the broke may be derived from a variety of types of paper products, such as tissues, tissues, towels, wipers, napkins, etc., which includes waste materials generated during the manufacture of such products. Generally speaking, the basis weight of the paper products ranges from about 5 to about 200 grams per square meter (gsm), in some embodiments from about 10 to about 175 gsm, and in some embodiments, from about 20 gsm to about 150 gsm. For example, paper towels may have a basis weight of about 5 to about 100 gsm, and in some embodiments, from about 30 to about 85 gsm. Likewise, wipers may have basis weight of about 30 to about 175 gsm, and in some embodiments, from about 50 gsm to about 150 gsm. Lower basis weight products are typically well suited for use as light duty wipers, while the higher basis weight products are better adapted for use as industrial wipers.

For purposes of illustration only, various techniques for forming paper products from which latex-containing broke may be derived will now be described in more detail. It should be understood however, that the present invention is not limited to any particular source of broke, and that the description below is for exemplary purposes only.

Figure 2:
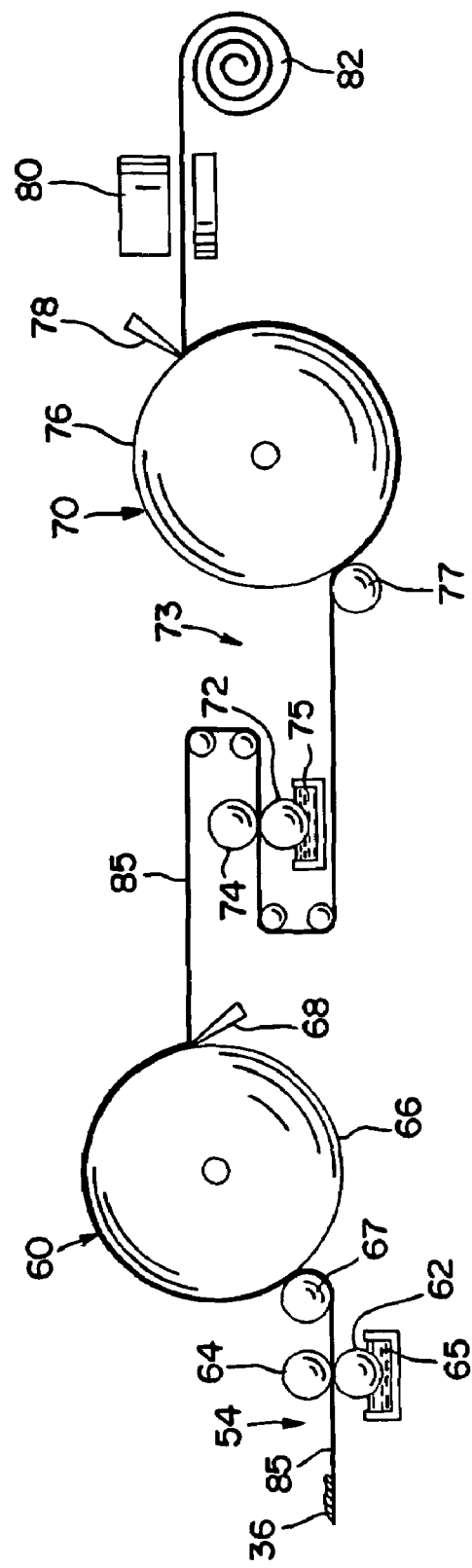
FIG. 2 is a schematic illustration of a process for forming a multi-layered paper web in accordance with one embodiment of the present invention.

In this regard, referring to FIGS. 1-2, one embodiment of a technique for forming a latex-treated paper towel is shown. In this embodiment, a multi-layered stratified web 36 is formed as shown in FIG. 1. Specifically, a three-layered head box 10 is provided that includes an upper head box wall 12 and a lower head box wall 14. The head box 10 further includes a first divider 16 and a second divider 18, which separate three fiber stock layers. Each of the fiber layers may include a dilute aqueous suspension of paper making fibers. An endless traveling forming fabric or surface 26, suitably supported and driven by rolls 28 and 30, receives the layered paper making stock issuing from head box 10. If desired, the forming surface 26 may have a three-dimensional contour. For instance, some suitable forming fabrics that may be used in the present invention include, but are not limited to, Albany 84M and 94M available from Albany International; Asten 856, 866, 892, 934, 939, 959, or 937; Asten Synweve Design 274, all of which are available from Asten Forming Fabrics, Inc. of Appleton, Wis. Other suitable forming fabrics may be described in U.S. Pat. No. 6,120,642 to Lindsay, et al. and U.S. Pat. No. 4,529,480 to Trokhan, which are incorporated herein in their entirety by reference thereto for all purposes.

Once retained on the forming surface 26, water passes through the layered web 36 as shown by the arrows 32. Water removal is achieved by combinations of gravity, centrifugal force, and vacuum suction depending on the forming configuration. Other suitable methods for forming multi-layered paper webs are described in U.S. Pat. No. 5,129,988 to Farrington, Jr. and U.S. Pat. No. 5,494,554 to Edwards, et al., which are incorporated herein in their entirety by reference thereto for all purposes.

Upon formation, the paper web may be subjected to a creping process (e.g., single recreping (SRC), double recreping (DRC), etc.). For example, some suitable creping techniques are described in U.S. Pat. No. 3,879,257 to Gentile, et al.; U.S. Pat. No. 6,315,864 to Anderson, et al.; and U.S. Pat No. 6,500,289 to Merker, et al., which are incorporated herein in their entirety by reference thereto for all purposes. Other suitable creping processes are described in U.S. Pat. No. 3,260,778 to Walton; U.S. Pat. No. 4,919,877 to Parsons, et al.; U.S. Pat. No. 5,102,606 to Ake, et al.; U.S. Pat. No. 5,498,232 to Scholz; and U.S. Pat. No. 5,972,039 to Honeycutt, et al., which are all incorporated herein in their entirety by reference thereto for all purposes. Referring to FIG. 2, for instance, one method for creping the paper web is illustrated. As shown, the web 36 is disposed on a support surface 85, such as a wire or fabric. As described above, the support surface 85 may be smooth or patterned.

While on a support surface 85, the web 36 is passed through a latex application station 54. This station 54 includes a nip formed by a smooth rubber press roll 64 and a patterned metal rotogravure roll 62. The lower transverse portion of the rotogravure roll 62 is disposed in a bath 65 containing a latex, such as described above. The rotogravure roll 62 applies an engraved pattern of the latex to one surface of the web 36. The web 36 may optionally be passed through a drying station (not shown) where the latex is partially dried or set. The drying station may include any form of heating unit well known in the art, such as ovens energized by infrared heat, microwave energy, hot air, etc. The web 36 is then pressed into adhering contact with the creping drum 60 by the press roll 67. The pattern and/or pressure of the press roll 67 may be varied to optimize the texture of the resulting web 36. After being pressed against the drum 60, the web 36 is carried on the surface 66 of the drum 60 for a distance and then removed therefrom by the action of a creping blade 68.

The other side of the web 36 may be creped using a second latex application station 73, regardless of whether or not the first latex application station 54 is bypassed. The second latex application station 73 is illustrated by smooth rubber press roll 74, rotogravure roll 72, and a bath 75 containing a second latex, such as described above. This latex is also applied to the web 36 in a patterned arrangement, although not necessarily in the same pattern as that in which the first latex is applied to the first side. Even if the two patterns are the same, it is not necessary to register the two patterns to each other. In addition, the same or different latex may be applied at the second latex application station 73. The rotogravure roll 72 applies an engraved pattern of the latex to one surface of the web 36. The web 36 is then pressed into adhering contact with the creping drum 70 by the press roll 77. After being pressed against the drum 70, the web 36 is carried on the surface 76 of the drum 70 for a distance and then removed therefrom by the action of a creping blade 78. After creping, the web may optionally be passed through a chilling station 80 and wound onto a storage roll 82.

B. Processing of Latex-Containing Broke

Regardless of its origin, the present inventors have surprisingly discovered that latex-containing broke may be recycled for use in other products without the need for conventional chemical treatments, such as hypochlorites. To accomplish this reclamation, the latex-containing broke is subjected to one or more mechanical treatments that degrade and reduce the size of the fibers.

In one embodiment, the latex-containing broke is first subjected to a pulping process to break down the fibers and reduce their size. To begin the pulping process, the latex-containing broke is diluted with water and then introduced into a pulper. One particular type of pulper that may be used in the present invention is commonly referred to as a "rotor/stator" pulper. The rotor and stator acquire and cut fibers with a scissors-like action. The cutting occurs at an interface having a truncated conical geometry. In one embodiment, the interface is defined, in part, by a series of generally triangular segments, or "lobes" of the stator. Each lobe curves along an outer edge of a generally circular base and inclines inwardly. The inner surface of these lobes defines a conical interface. An outer cutting edge of the blades on the base of the rotor define the inner boundary of the interface. The cutting occurs between the blade cutting edges and the leading edge of each triangular stator lobe. Once acquired and reduced to a sufficiently small size, the material is defibered in an attrition zone of the pulper between the lobes and the outer edges of the blades. One suitable rotor/stator-type pulper is the "TORNADO" pulper, which is commercially available from Bolton-Emerson of Lawrence, Mass. It is believed that the "TORNADO" pulper is described in U.S. Pat. No. 4,365,761 to Danforth, which is incorporated herein in its entirety by reference thereto for all purposes. Other suitable rotor/stator types of pulpers are also described in U.S. Pat. No. 4,482,095 to Danforth; U.S. Pat. No. 5,011,091 to Kopecky; U.S. Pat. No. 6,053,441 to Danforth, et al.; U.S. Pat. No. 6,302,342 to Danforth, et al., which are also incorporated herein in their entirety by reference thereto for all purposes.

After the pulping process is complete, it may be desired in some instances to subject the latex-containing broke to one or more refinement steps. Refinement results in an increase in the amount of intimate contact of the fiber surfaces and may be performed using devices well known in the art, such as a disc refiner, a double disc refiner, a Jordan refiner, a Claflin refiner, or a Valley-type refiner. Various suitable refinement techniques are described, for example, in U.S. Pat. No. 5,573,640 to Frederick, et al., which is incorporated herein in its entirety by reference thereto for all purposes.

Pulping and refinement degrade the broke. The level of fiber degradation may be characterized as "Canadian Standard Freeness" (CSF) (TAPPI Test Methods T-227 OM-94.), which is generally a measurement of the drainage properties of fibers. For example, 800 CSF represents a relatively low amount of degradation, while 400 CSF represents a relatively high amount of degradation. In most embodiments of the present invention, the fibers are refined to about 400 to about 800 CSF, and in some embodiments, from about 600 CSF to about 750 CSF.

Pulping and refinement also generally transform the latex-containing broke into fiber aggregates having a small size for reuse in other products. For instance, larger particles generally have a negative affect on the handfeel of the product. However, it is usually not desired to reduce the size of the fibers to such an extent that they effectively become "fines", which do not possess as good as functional characteristics as larger materials. Thus, in some embodiments, the average diameter of the fiber aggregates may range from about 0.2 millimeters to about 12 millimeters, in some embodiments from about 0.5 millimeters to about 6 millimeters, and in some embodiments, from about 1 millimeter to about 4 millimeters. For example, in some embodiments, the latex-containing broke may be degraded by the pulper into fiber aggregates having an average diameter of less than about 6 millimeters by the pulper, while refinement may be used to further reduce the size of such aggregates to less than about 4 millimeters.

Besides having a reduced size, the fiber aggregates have also been unexpectedly discovered to have other unique properties. For instance, a large portion of the resulting fiber aggregates may be relatively free from the latex polymer. Specifically, the fiber aggregates contain a "core" of latex from which extend short fibers and/or fragments that are uncoated with the latex. The result is fiber aggregates that are uniquely "partially coated" with a latex polymer. For example, 40% or more of the total fiber area, in some embodiments 50% or more of the total fiber area, and in some embodiments, 60% or more of the total fiber area may include fibers and/or fiber fragments that are relatively free from the latex polymer. By "relatively free", it should be understood that small amounts of latex polymer may be present on the fibers and/or fiber fragments, such as from about 1% to about 20%, and in some embodiments, 1% to about 10% of the area of such fibers and/or fiber fragments.

Without intending to be limited by theory, it is believed that these unique "partially coated" aggregates are due in part to the source of broke. For instance, as indicated above, the source of broke may be a product in which only a portion of the fibers are latex-treated. Examples of such products are those having a surface on which latex is printed in a spaced apart pattern. The presence of latex polymer only on the surface of the latex-treated paper product allows much of the interior of the product to remain relatively free from the latex polymer. Thus, when processed, the fibers of the interior are more likely to remain free from latex treatment when degraded into smaller fibers and/or fiber fragments.

To optimize the effectiveness of pulping and refinement in achieving the desired fiber aggregate size and degradation level, a variety of parameters may be selectively controlled. For instance, the solids consistency of the broke, temperature, the distance of the cutting interface, i.e., "clearance" between the rotor and stator, the processing time, throughput rate, and type of broke, etc., may be selectively controlled to achieve the desired fiber aggregate characteristics. For example, higher solid consistencies of the broke generally result in a greater fiber-to-fiber interaction within the mixture, which in turn, allows the pulper and refiner to operate more effectively in degrading and reducing fiber size. However, too high of a solids consistency can sometimes clog the system. Thus, in most embodiments of the present invention, the broke is adjusted to a solids consistency from about 2% to about 15%, in some embodiments from about 4% to about 10%, and in some embodiments, from about 6% to about 8%, before being subjected to pulping and refinement.

Moreover, smaller rotor/stator clearance values and longer processing times also result in a greater level of fiber degradation and size reduction. To achieve the desired fiber aggregate characteristics, the clearance value typically ranges from about 0.001 inches (1 mil) to about 0.1 inches (100 mils), in some embodiments from about 0.005 inches (5 mils) to about 0.05 inches (50 mils), and in some embodiments, from about 0.01 inches (10 mils) to about 0.025 inches (25 mils). The recirculation time during pulping may also range from about 1 minute to about 500 minutes, in some embodiments from about 5 minutes to about 120 minutes, and in some embodiments, from about 10 minutes to about 60 minutes. Similarly, the recirculation time during refinement may also range from about 1 minute to about 500 minutes, in some embodiments from about 5 minutes to about 120 minutes, and in some embodiments, from about 10 minutes to about 60 minutes.

C. Uses of Processed Broke

Once processed according to the present invention, the broke may be recycled in paper products in a variety of ways. For example, the fiber aggregates derived from the processed broke may be re-dispersed in a water slurry, and thereafter, blended with other furnish components used to produce tissue, towels, wipers, or other similar paper products. In one embodiment, the fiber aggregates may be utilized in one or more layers of a paper web. The balance of the layer(s) containing the broke may generally contain any type of fibers as is well known in the art. For instance, the fiber aggregates may be combined with pulp fibers, such as hardwood fibers (e.g., eucalyptus), softwood fibers (e.g., northern softwood kraft), etc.; synthetic fibers; and so forth. Although not required, it is typically desired that the fiber aggregates constitute less than about 75% by weight of the layer, in some embodiments less than about 60% by weight of the layer, and in some embodiments, from about 10% to about 50% by weight of the layer. Likewise, the non-recycled fibrous portion of the layer may constitute more than about 25% by weight of the layer, in some embodiments more than about 40% by weight of the layer, and in some embodiments, from about 50% to about 90% of the layer.

In one particular embodiment, the fiber aggregates may be combined with pulp fibers in an inner layer of a multi-layered paper web, such as the center layer of a three-layered paper web. The placement of fiber aggregates in an inner layer may be accomplished, for example, using a multi-layered headbox, such as shown in FIG. 1. For example, the fiber aggregates may be blended with a pulp furnish and then supplied between the first divider 16 and second divider 18 of the headbox 10. When used in this manner, the latex-containing aggregates may increase the adhesion of the fibers of the outer layers due to the tackiness of the latex polymer, thus making it more difficult for the outer layers to separate from the inner layer when subjected to unwinding forces during the converting stage. The presence of the latex polymer may also help increase the strength of the product.

Regardless of the manner in which it is used, the fiber aggregates formed according to the present invention may provide numerous other benefits. For instance, the ability to recycle paper products with a high latex content results in substantial cost and environmental savings. Apart from these benefits, the physical properties of paper products may also be improved. For instance, the small size of the fiber aggregates allows them to be used in paper products without adversely affecting handfeel or softness.

The fiber aggregates may also impart other beneficial characteristics to the paper product. For instance, as discussed above, the fiber aggregates may be uniquely "partially coated" with a latex polymer, leaving a portion of the aggregates free from the latex. This is beneficial for a variety of reasons. For instance, most latex polymers are hydrophobic and thus have poor water absorption capacities. Thus, if the fiber aggregates were "fully coated" with a latex polymer, they would also be hydrophobic. However, the "partially coated" fiber aggregates formed in the present invention have fibers and/or fiber fragments that are relatively free of the latex polymer. These fibers remain available to absorb water or other liquids. Thus, the present invention is uniquely capable of utilizing the inherent hydrophilic nature of certain types of fibers, such as pulp fibers, even though the fibers were previously derived from a product that was treated with high amounts of a hydrophobic latex polymer.

In addition, the presence of a "core" of a latex polymer within the aggregates may also reduce the likelihood of "wet collapse" when a product is used to wipe liquids. Specifically, as opposed to conventional pulp fibers, the latex core of the fiber aggregates is generally incompressible when wet. Thus, the latex core may resist the forces of compression applied during wiping, thereby inhibiting "wet collapse."

The present invention may be better understood with reference to the following examples. The following test methods were used in the Examples.

Test Methods

Canadian Standard Freeness: The level of fiber degradation was measured as "Canadian Standard Freeness" (CSF) in substantial accordance with TAPPI Test Methods T-227 OM-94. Lower CSF values represented higher levels of fiber degradation.

Size Distribution: The size of the fiber aggregates was determined using a Bauer-McNett size classifier and in substantial accordance with TAPPI Test Methods T-233. The Bauer-McNett size classifier is designed to classify the distribution of fibers by dividing them into fractions based on sieves of different mesh sizes. For instance, the percentage of fiber aggregates remaining on an 8-mesh (~2.2 millimeters), 10-mesh (~2 millimeters), 14-mesh (~1.6 millimeters), 20-mesh (~1.25 millimeters), and 28-mesh (~0.75 millimeters) was tested.

Water Absorption Capacity: The water absorption capacity refers to the capacity of a material to absorb water over a period of time and is related to the total amount of water held by the material at its point of saturation. The absorption capacity is measured in accordance with Federal Specification No. UU-T-595C on towels and wipers. Specifically, water absorption capacity is determined by measuring the increase in the weight of the sample resulting from the absorption of water and is expressed, in percent, as the weight of water absorbed divided by the weight of the sample by the following equation:

Absorption Capacity=[(saturated sample weight−sample weight)/sample weight]×100.

Grab Tensile Strength: The grab tensile test is a measure of breaking strength of a material when subjected to unidirectional stress. This test is known in the art and conforms to the specifications of Method 5100 of the Federal Test Methods Standard 191A. The results are expressed in pounds to break. Higher numbers indicate a stronger material. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 tester, available from the Sintech Corporation of Cary, N.C., an Instron Model TM, available from the Instron Corporation of Canton, Mass., or a Thwing-Albert Model INTELLECT II available from the Thwing-Albert Instrument Co. of Philadelphia, Pa. This closely simulates stress conditions in actual use. Results are reported as an average of three specimens and may be performed with the specimen in the cross direction (CD) or the machine direction (MD).

Peel Strength: In peel or delamination testing, a multi-layered material is tested for the amount of tensile force that will pull the layers apart. Values for peel strength are obtained using a specified width of material, clamp jaw width, and a constant rate of extension. This test uses two clamps, each having two jaws with each jaw having a facing in contact with the sample, to hold the material in the same plane, usually vertically, separated by 2 inches to start. The sample size is 4 inches wide by as much length as necessary to delaminate enough sample length. The jaw facing size is 1 inch high by at least 4 inches wide, and the constant rate of extension is 300 mm/min. The sample is delaminated by hand a sufficient amount to allow it to be clamped into position, and the clamps move apart at the specified rate of extension to pull the laminate apart. The sample specimen is pulled apart at 180° of separation between the two layers, and the peel strength reported is an average of three tests, peak load in grams. Measurement of the force begins when 16 mm of the laminate has been pulled apart, and it continues until a total of 170 mm has been delaminated. The Sintech 2 tester, the Instron Model™, or the Thwing-Albert Model INTELLECT II may be used for this test.

EXAMPLE 1

The ability to recycle a latex-treated paper product in accordance with the present invention was demonstrated. 24 samples were prepared. Samples 1-6 and 13-24 contained a mixture of approximately 70 wt. % Wypall® towels (blue), 25 wt. % Economizer® towels (white), and 5 wt. % cores. Samples 7-12 contained approximately 95 wt. % Wypall® towels (blue) and 5 wt. % cores. The Wypall® and Economizer® towels were made as described above and shown in FIGS. 1-2. Each towel was formed from northern softwood kraft pulp fibers. The basis weight of the Wypall® towel was about 82 grams per square meter, while the basis weight of the Economizer® towel was about 56 grams per square meter. Each towel contained from about 10-20 wt. % of an ethylene/vinyl acetate latex co polymer.

The broke mixture was diluted with water to a solid consistency of 6% or 8% and supplied to a Tornado® pulper from Bolton-Emerson, Inc. of Lawrence, Mass. During pulping, the water temperature was maintained at 120° F. and the recirculation rate was 3000 gallons per minute. Rotor/stator clearances of 10 mils and 25 mils were tested. For each set of conditions tested, 2 samples (10 gallons each) were removed from the recirculation line at 10, 20, and 30-minute intervals. After pulping, the samples were then supplied to a Claflin refiner obtained from Bolton-Emerson. Before entering the refiner, the samples were diluted to 4% consistency to prevent clogging of the refiner, which operated at a throughput of 13 gallons per minute. Each diluted sample was refined at 10 gallons per minute at rotor/stator clearances of 7.5 mils and 15 mils.

The pulping and refinement conditions are provided in Table 1.

TABLE 1

Conditions of Pulping

| Sample | Solids Consistency (%) | Rotor/Stator Clearance (mils) | Time (mins) |
|---|---|---|---|
| 1 | 6 | 10 | 10 |
| 2 | 6 | 10 | 10 |
| 3 | 6 | 10 | 20 |
| 4 | 6 | 10 | 20 |
| 5 | 6 | 10 | 30 |
| 6 | 6 | 10 | 30 |
| 7 | 8 | 25 | 10 |
| 8 | 8 | 25 | 10 |
| 9 | 8 | 25 | 20 |
| 10 | 8 | 25 | 20 |
| 11 | 8 | 25 | 30 |
| 12 | 8 | 25 | 30 |
| 13 | 6 | 25 | 10 |
| 14 | 6 | 25 | 10 |
| 15 | 6 | 25 | 20 |
| 16 | 6 | 25 | 20 |
| 17 | 6 | 25 | 30 |
| 18 | 6 | 25 | 30 |
| 19 | 8 | 10 | 10 |
| 20 | 8 | 10 | 10 |
| 21 | 8 | 10 | 20 |
| 22 | 8 | 10 | 20 |
| 23 | 8 | 10 | 20 |
| 24 | 8 | 10 | 20 |

TABLE 2

Conditions of Refinement

| Sample | Solids Consistency (%) | Rotor/Stator Clearance (mils) |
|---|---|---|
| 1 | 4 | 7.5 |
| 2 | 4 | 15.0 |
| 3 | 4 | 7.5 |

TABLE 2-continued

Conditions of Refinement

| Sample | Solids Consistency (%) | Rotor/Stator Clearance (mils) |
|---|---|---|
| 4 | 4 | 15.0 |
| 5 | 4 | 7.5 |
| 6 | 4 | 15.0 |
| 7 | 4 | 7.5 |
| 8 | 4 | 15.0 |
| 9 | 4 | 7.5 |
| 10 | 4 | 15.0 |
| 11 | 4 | 7.5 |
| 12 | 4 | 7.5 |
| 13 | 4 | 7.5 |
| 14 | 4 | 15.0 |
| 15 | 4 | 7.5 |
| 16 | 4 | 15.0 |
| 17 | 4 | 7.5 |
| 18 | 4 | 15.0 |
| 19 | 4 | 7.5 |
| 20 | 4 | 15.0 |
| 21 | 4 | 7.5 |
| 22 | 4 | 15.0 |
| 23 | 4 | 7.5 |
| 24 | 4 | 15.0 |

Figure 3:
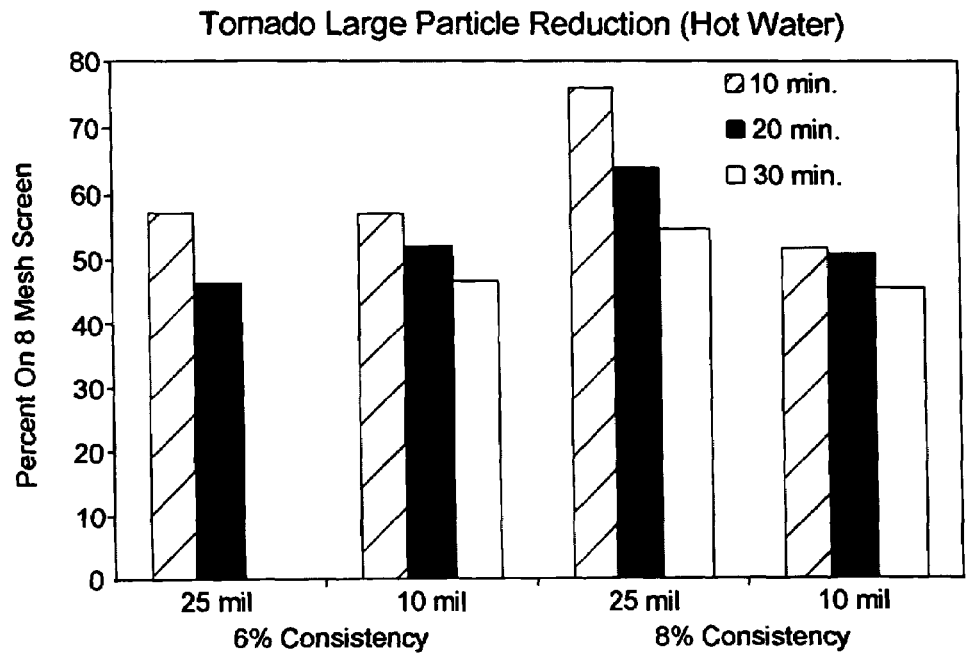
FIG. 3 is a graphical depiction of the percentage of fibers remaining on an 8-mesh screen after pulping as a function of solids consistency for recirculation times of 10, 20, and 30 minutes, in Example 1.
Figure 4:
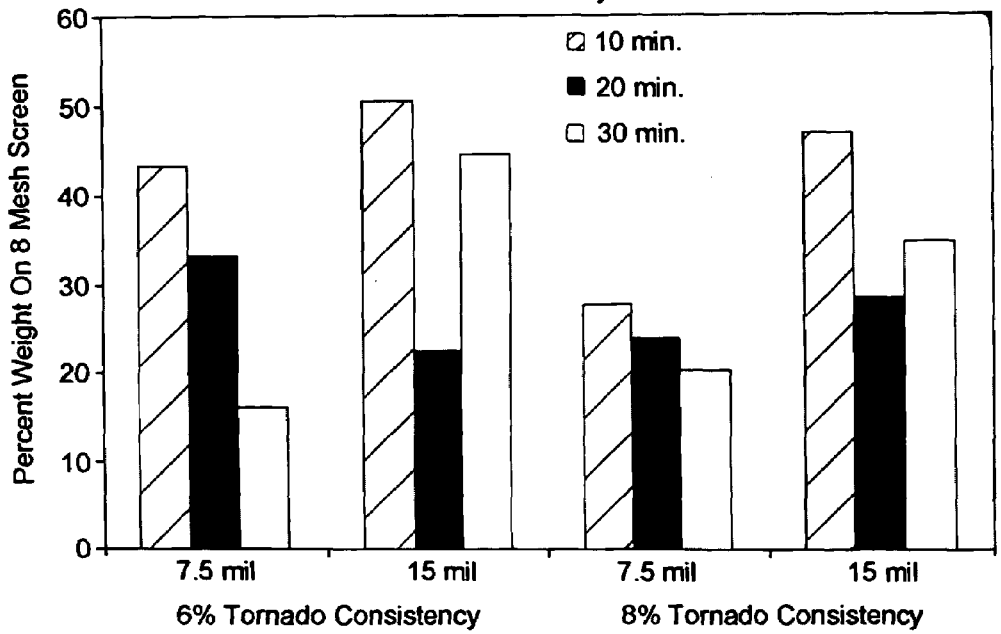
FIG. 4 is a graphical depiction of the percentage of fibers remaining on an 8-mesh screen after pulping (10 mil clearance) and refinement as a function of solids consistency for recirculation times of 10, 20, and 30 minutes, in Example 1.
Figure 5:
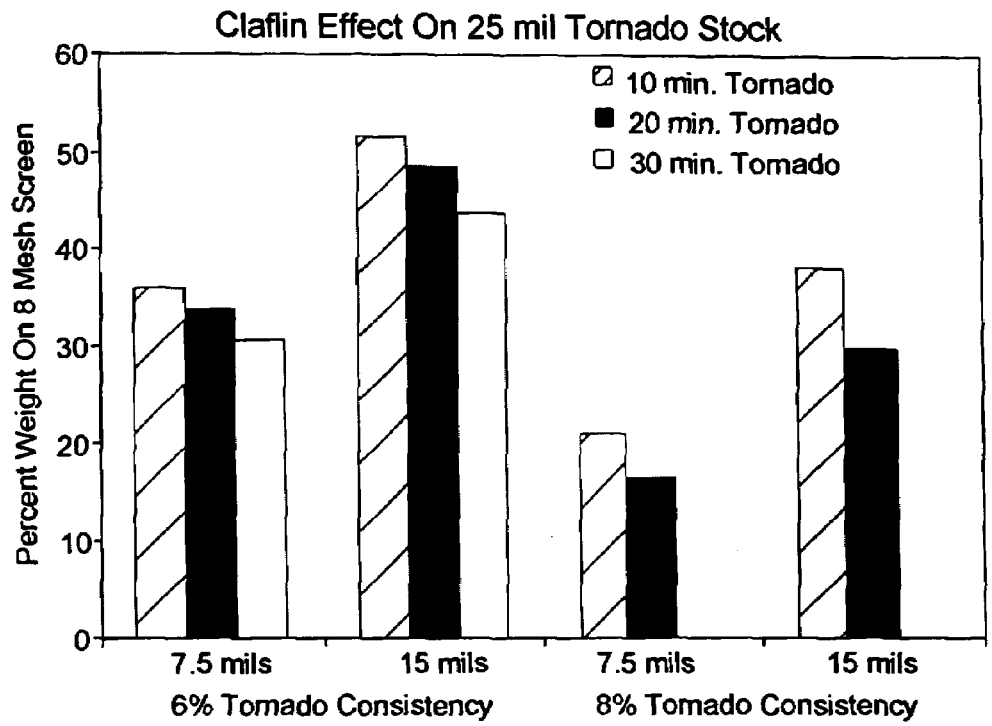
FIG. 5 is a graphical depiction of the percentage of fibers remaining on an 8-mesh screen after pulping (25 mil clearance) and refinement as a function of solids consistency for recirculation times of 10, 20, and 30 minutes, in Example 1.
Figure 6:
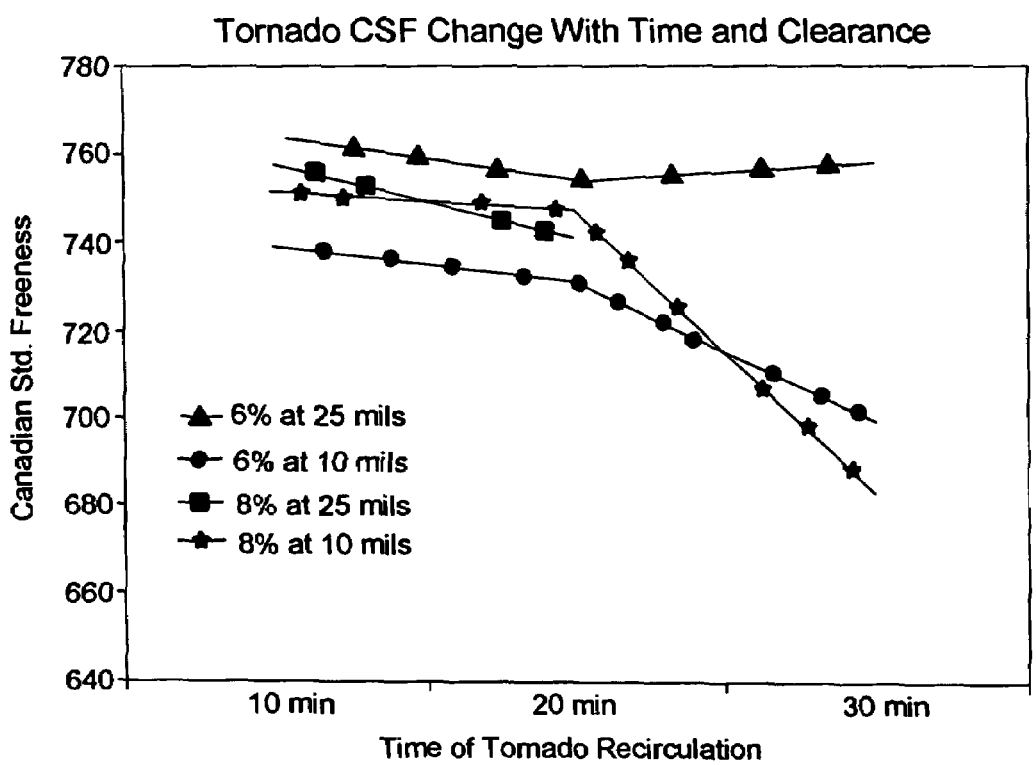
FIG. 6 is a graphical depiction of Canadian Standard Freeness as a function of pulping recirculation times for solids consistencies of 6% and 8% and rotor/stator clearances of 10 mils and 25 mils, in Example 1.
Figure 7:
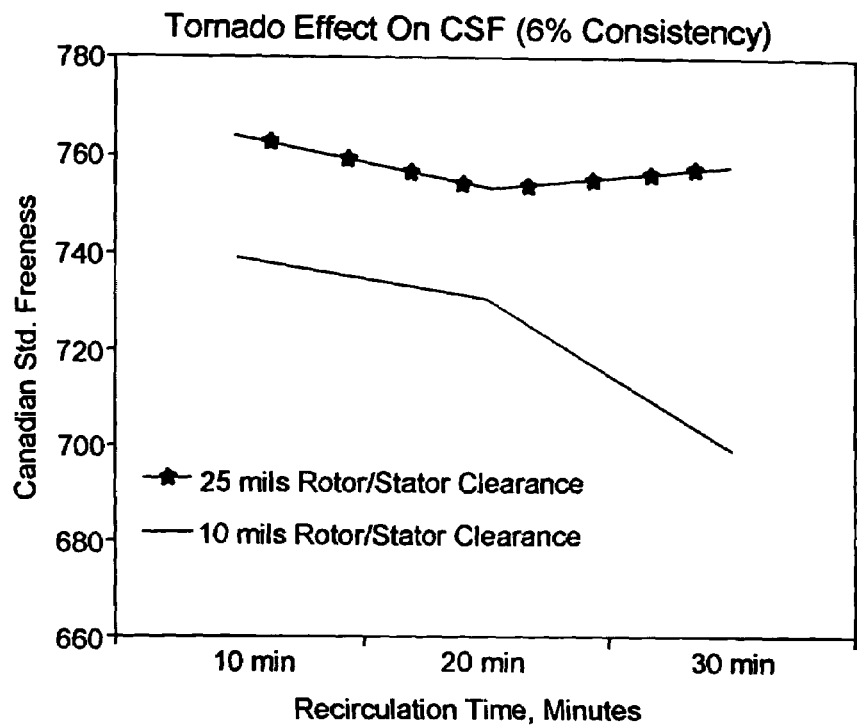
FIG. 7 is a graphical depiction of Canadian Standard Freeness as a function of pulping recirculation times for solids consistencies of 6% and rotor/stator clearances of 10 mils and 25 mils, in Example 1.
Figure 8:
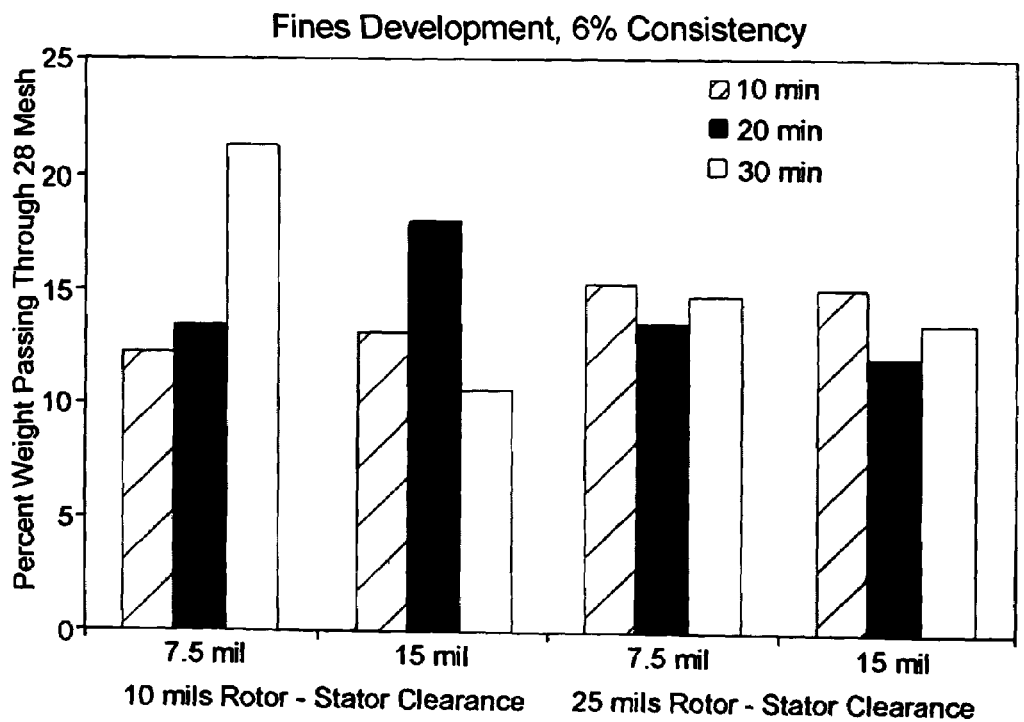
FIG. 8 is a graphical depiction of the percentage of fines passing through a 28-mesh screen after pulping (10 and 25 mil clearance) and refinement as a function of refiner clearances for recirculation times of 10, 20, and 30 minutes, in Example 1.
Figure 9:
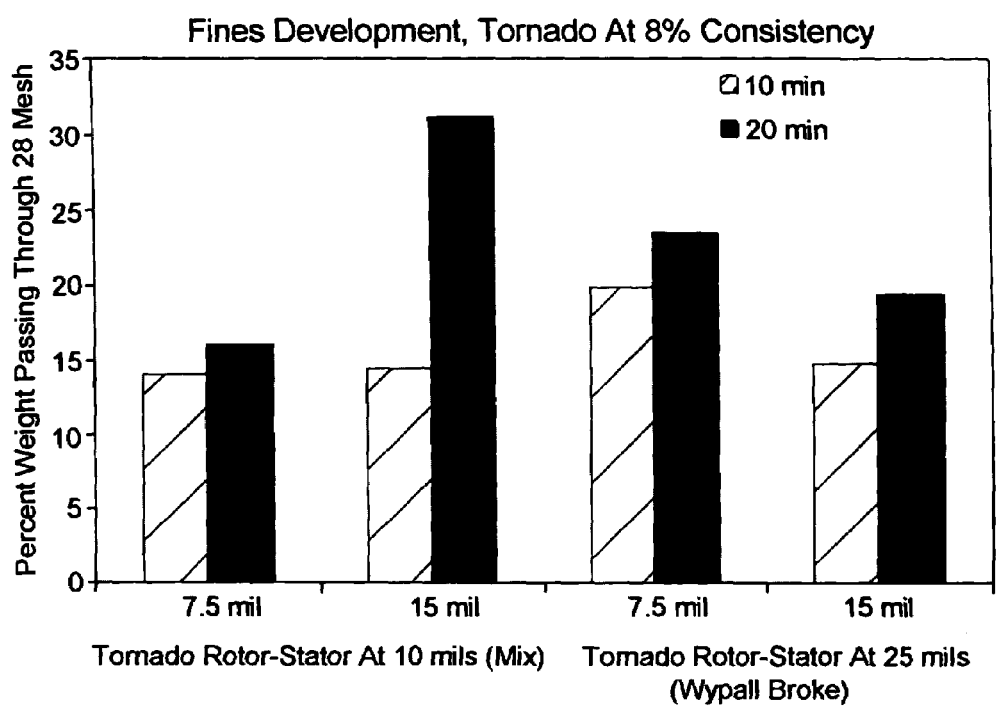
FIG. 9 is a graphical depiction of the percentage of fines passing through a 28-mesh screen after pulping (10 and 25 mil clearance) and refinement as a function of refiner clearances for recirculation times of 10 and 20, in Example 1.

The Canadian Standard Freeness and size distribution were measured at various stages of the process. The results are given in FIGS. 3-7. For instance, as shown in FIG. 3, a high percentage of aggregates remained on the 8-mesh screen in all instances after pulping. All samples had greater than 40% of aggregates remaining on the 8-mesh screen, and many samples had greater than 50% or greater than 60% of aggregates remaining on the 8-mesh screen. In this particular test, the best results were achieved at a solids consistency of 8% and a rotor/stator clearance of 25 mils. Likewise, as shown in FIGS. 4-5, a high percentage also remained on the 8-mesh screen after refinement. FIGS. 6-7 illustrate the affect of pulping on Canadian Standard Freeness as a function of time. As indicated, Canadian Standard Freeness was generally reduced after longer (pulping) times, and typically remained less than about 750. The percentage of "fines", i.e., very small particles, was also determined for several samples by measuring the percentage of aggregates passing through a 28-mesh wire screen. The results are given in FIGS. 8-9. Generally speaking, longer recirculation times resulted in a higher percentage of fines.

Image analysis was also conducted on several of the samples. To prepare the samples for testing, the broke fiber cake was initially dispersed and stained with Dupont #4 dye according to the following procedure.

1. Bring 300 ml distilled water in 500 ml beaker to a boil.
2. Add pulp equal to about 8 square centimeters of moist sheet to the boiling water.
3. Stir until dispersed and return to a boil.
4. Add duPont Fiber Identification Stain #4, stir continuously for one minute and remove from heat.
5. Transfer ⅓ of contents to the filter funnel and draw down with vacuum.
6. Resuspend the filter cake with the wash bottle and distilled water and draw down with vacuum.
7. Repeat step 6 until wash water is mildly discolored.
8. Resuspend the filter cake and transfer to a separate beaker.
9. Repeat steps 5-8 with each of the remaining thirds of pulp suspension and add to the first third.
10. When filtering slows, rejuvenate the glass frit filter by adding 72% $H_2SO_4$, let stand for 10 minutes and rinse with distilled water and vacuum draw-down; repeat if needed (The pulp fines tend to plug the frit and are removed by dissolving them).
11. Transfer the entire batch of rinsed pulp back into the cleaned filter funnel, add water to suspend and draw down with vacuum.
12. Resuspend filter cake with water and draw down until rinse water runs clear.
13. Assemble the 47 mm filter funnel, sandwiching a Whatman #3 cellulose filter between the funnel and base.
14. Add 50 ml of water to the funnel.
15. Pipette 1 to 3 drops of stained pulp suspension into the water, squirt in some water to agitate and disperse the particles and draw down with vacuum. Adjust the amount of suspension to produce mostly separated particles with little overlap.
16. Remove filter and dry on a slide warmer.

Thirteen (13) filter samples for imaging and analysis according to the procedure set forth above, all of which contained latex stained a dark brown color and uncoated fibers stained a yellowish color. The samples were then analyzed using the following materials:

Imaging Acquisition:

Zeiss KS400 Image Analysis System. Axiocam CCD camera (1300×1030 pixels) 8-bit interpolated RGB. Optics: Nikon 60 mm lens, f2.8, 20 mm extension tube; 6.03 μm pixel size. Incident floodlights (double Variac 60.90). Gain 1, 96 ms exposure. Flat field correction in color mode. Pole Position (Top); 76.2 mm. Sample Prep: laid flat on the stage with a ¼" glass on top. Acquisition Code: Sparsemean-.MCR. Sampling protocol, 2×2 images from each filter paper spaced at 15 mm apart.

Image Analysis: Matlab (Mathworks, Inc.) R13 with Image Processing Toolbox. Images were initially thresholded in hue, saturation, and intensity. Intensity was normalized by the 0.5% clipped maximum intensity to account for lighting changes. Uncoated fibers were discriminated by saturation (s>0.2,normalized) morphological AND hue (0.1<h<0.3) AND intensity (I<0.9). Latex was discriminated by (s>0.2, (h>.0.95) OR (h<0.1), I<0.6). Complete fibers were uncoated or latex coated, and fibers/knits were identified by Euclidean sequential erosion. Area coverage was calculated as the coincidence of latex with complete fibers.

The histogram of the fiber-area weighted coverage by latex indicated that the coverage was generally "all or nothing." Specifically, 75% of the fiber area had low latex coverage (less than 20% covered), while only 10% of the fiber area had greater than 80% coverage. The weighted mean coverage was 18% (s.d. 29%, n=3822), although the distribution was decidedly non-Gaussian. In addition, the mean fiber/knit contour length was 2.7 mm (s.d. 19 mm, n=3808), although the knit might be composed of several fibers that contribute contour length to the aggregate. The histogram of sheet fragment and aggregate areas indicated that the weighted area of the large sheet fragments and aggregates was 8.37 $mm^2$ (s.d. 7.65, n=26). The total area of fibers was 313 $mm^2$, whereas the total area of sheet fragments and aggregates was 70 $mm^2$, resulting in an approximate weight fraction of 0.18.

Figure 10:
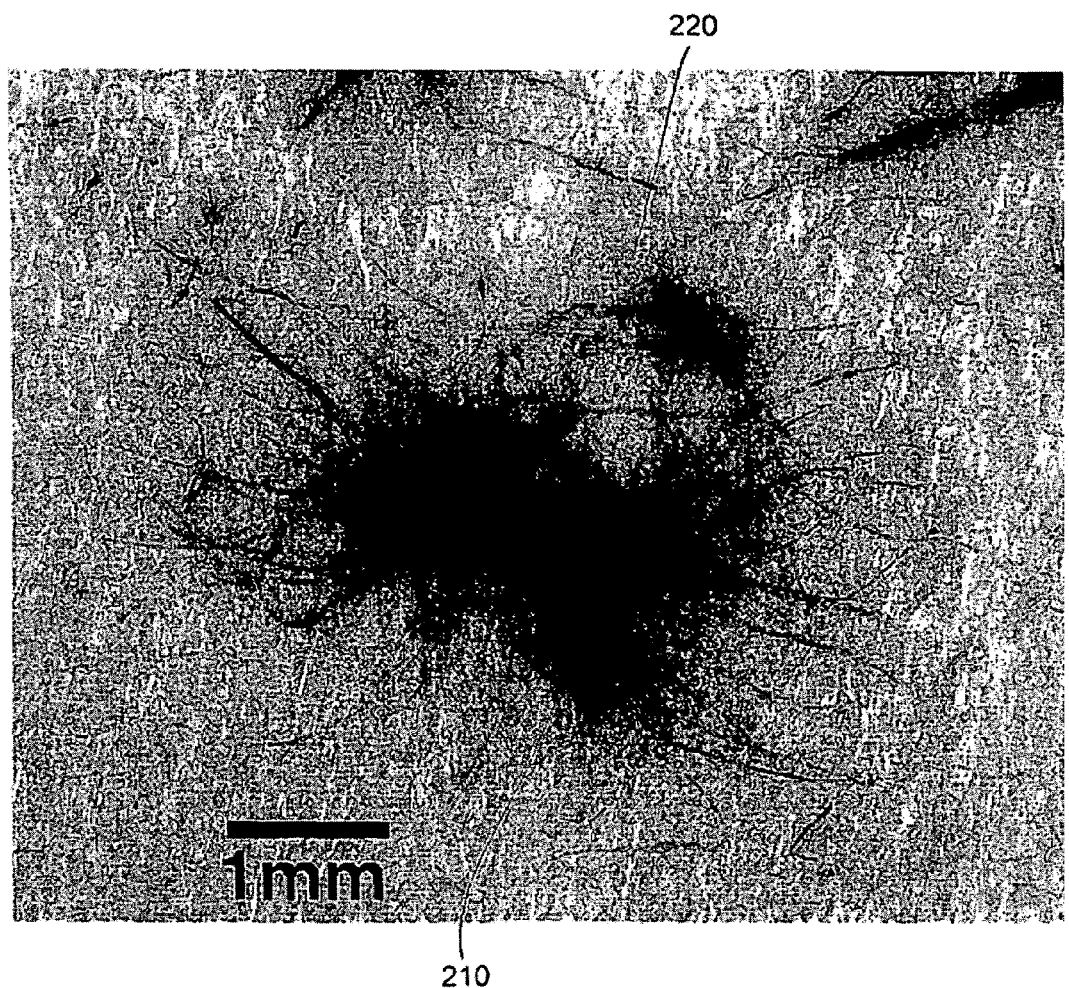
FIG. 10 is a microphotograph of a broke sample formed according to Example 1.
Figure 11:
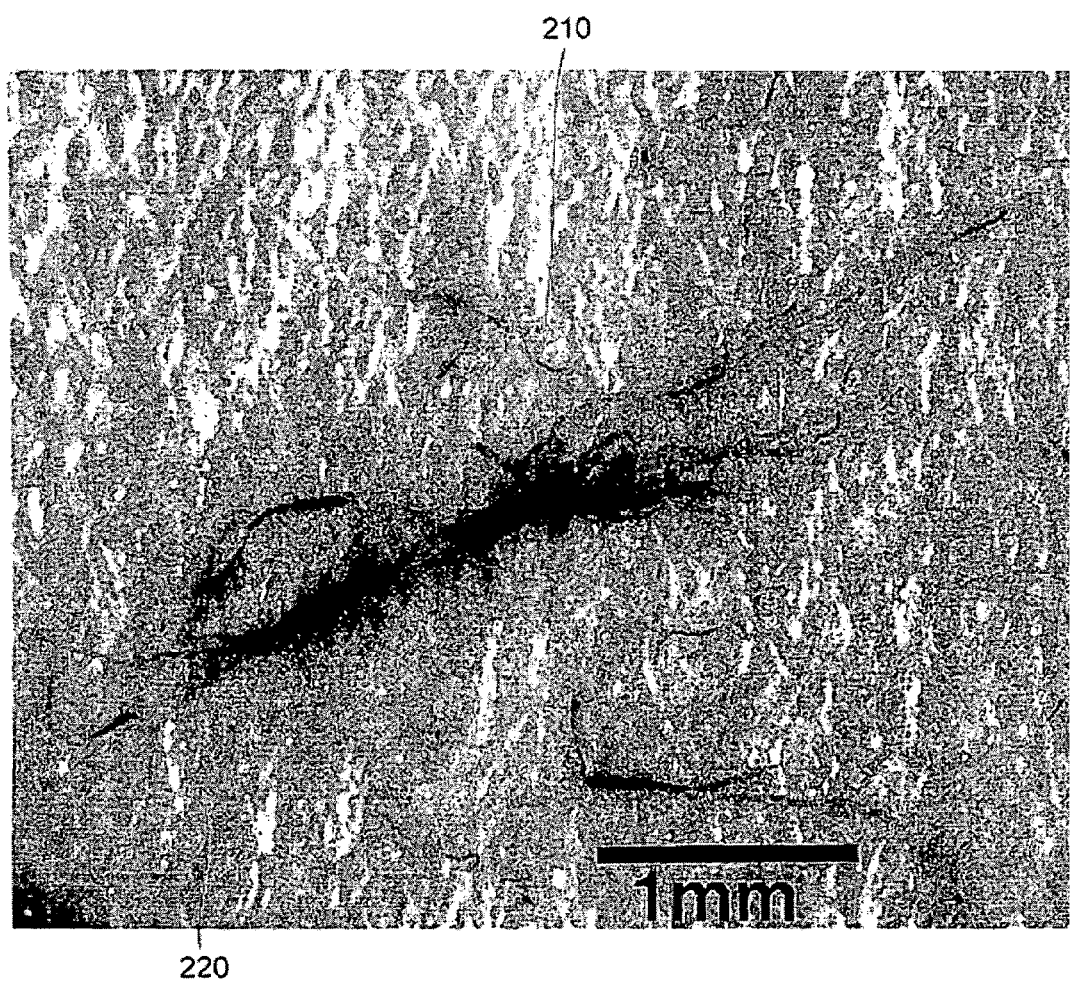
FIG. 11 is another microphotograph of a broke sample formed according to Example 1.
Figure 12:
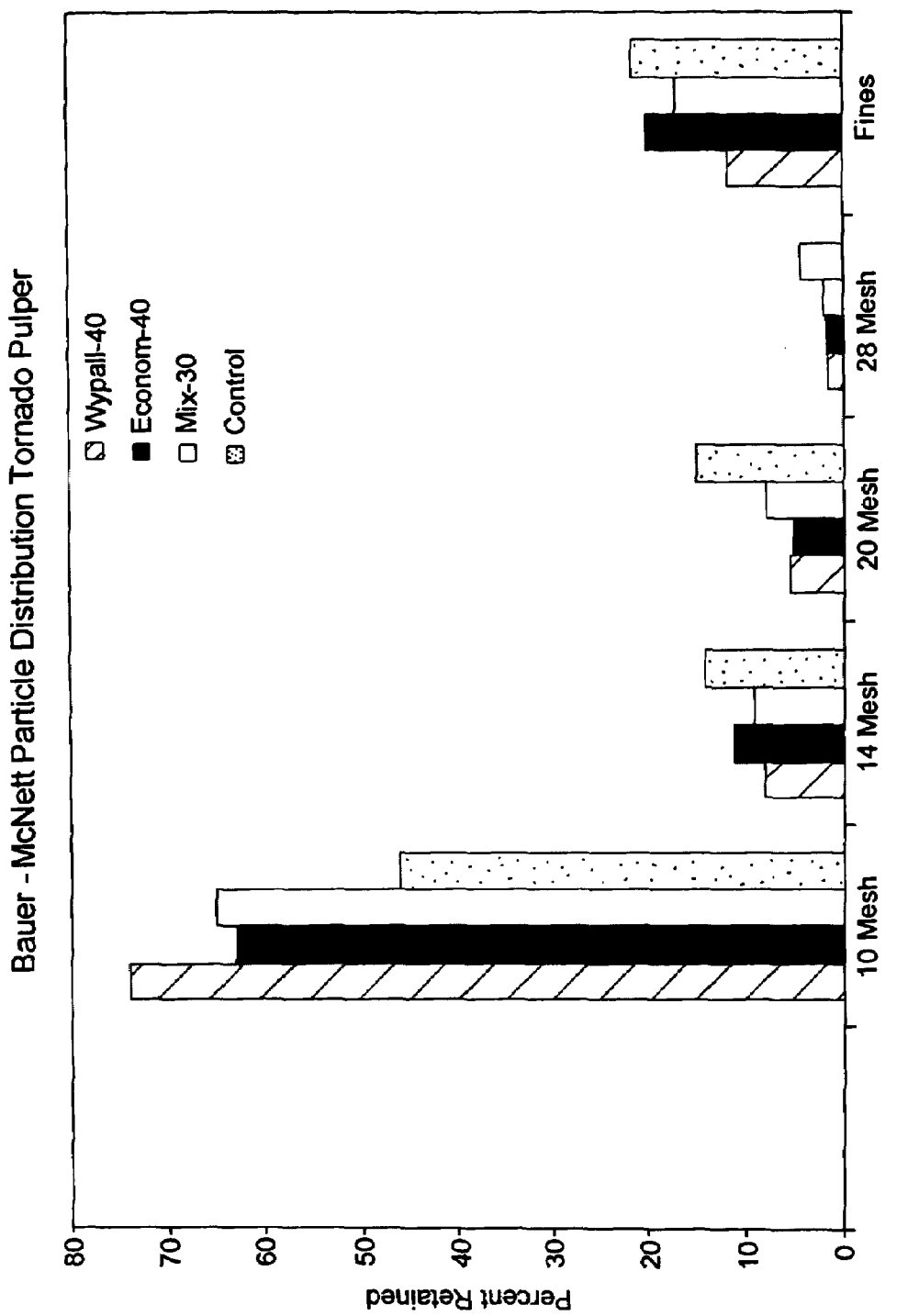
FIG. 12 is a graphical depiction of the percentage of fibers remaining on various screens after pulping, in Example 2.
Figure 13:
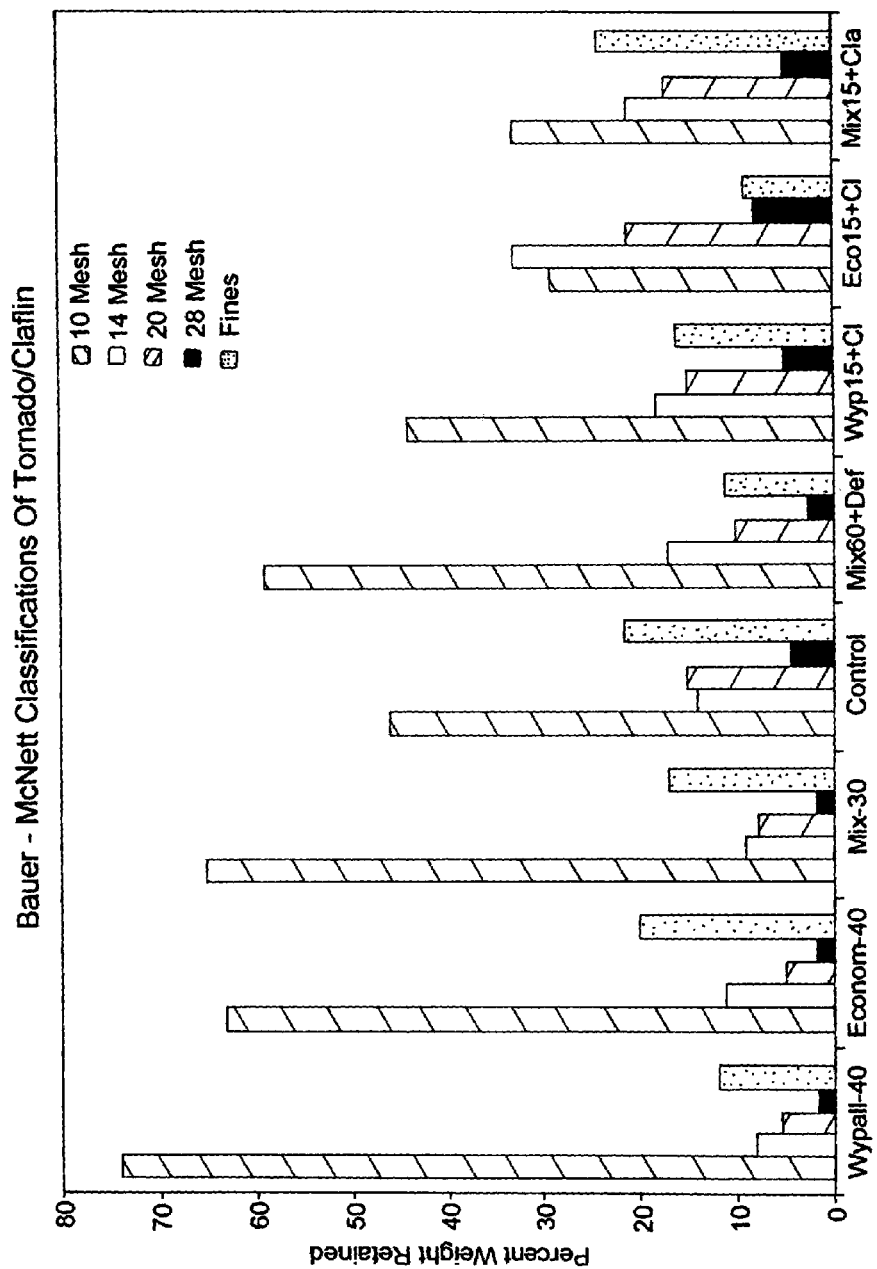
FIG. 13 is a graphical depiction of the percentage of fibers remaining on various screens after pulping and refinement, in Example 2.
Figure 14:
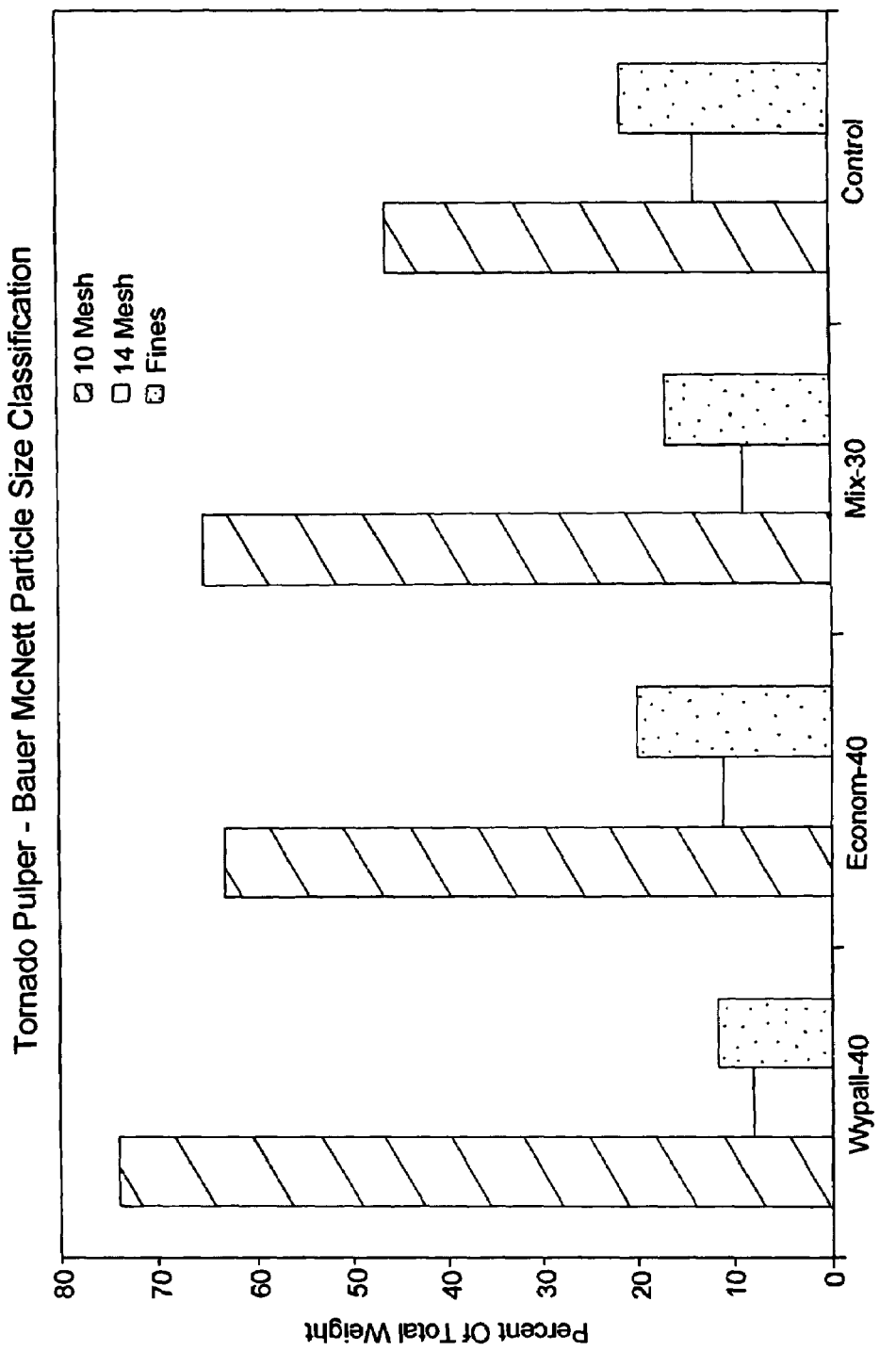
FIG. 14 is a graphical depiction of the percentage of fibers remaining on various screens after pulping, in Example 2.
Figure 15:
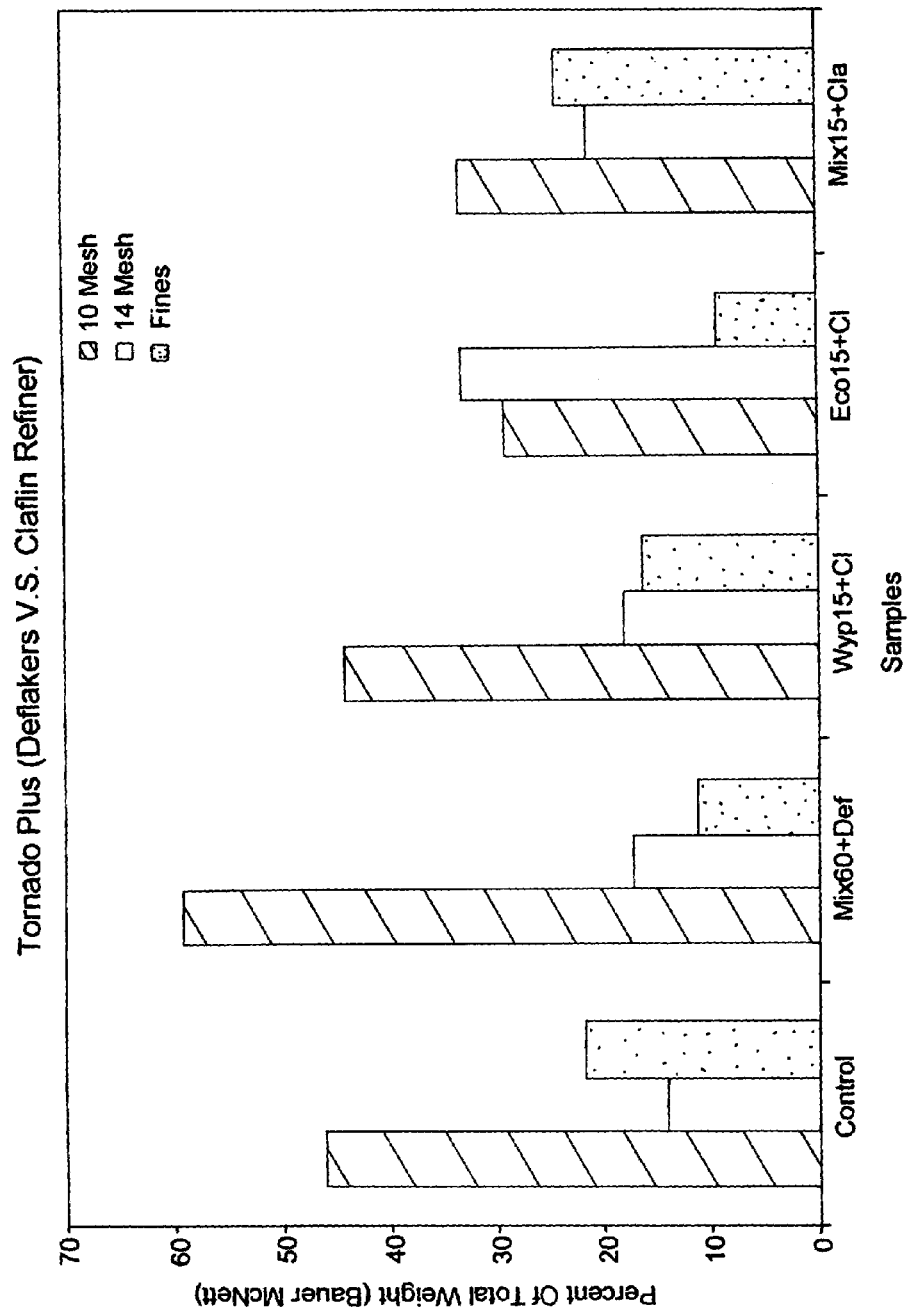
FIG. 15 is a graphical depiction of the percentage of fibers remaining on various screens after pulping and either deflaking or refinement, in Example 2.

FIGS. 10-11 show examples of images obtained after processing. One portion 210 of the fiber aggregates was coated with latex and thus colored dark brown, while another portion 220 of the fiber aggregates remained free of latex and thus colored yellow. Moreover, as shown In FIG. 10, the latex-coated portion 210 generally forms a "core" from which uncoated portions 220 extend.

EXAMPLE 2

The ability to recycle a latex-treated paper product in accordance with the present invention was demonstrated. Various sets of samples were prepared. One set contained Wypall® towels. Another set contained Economizer® towels. Still another set contained a mixture of approximately 30 wt. % Economizer® towels, 40% Wypall® towels, and 30 wt. % Viva® towels. The Wypall®, Economizer®, and Viva® towels were made as described above and shown in FIGS. 1-2. Each towel was formed from northern softwood kraft pulp fibers. The basis weight of the Wypall® towel was about 82 grams per square meter, the basis weight of the Economizer® towel was about 56 grams per square meter, and the basis weight of the Viva® towel was 65 grams per square meter. Each towel contained from about 5-20 wt. % of an ethylene/vinyl acetate latex co polymer.

The broke mixture was diluted with water to a solid consistency of 5.2% and supplied to a Tornado® pulper from Bolton-Emerson, Inc. of Lawrence, Mass. for various recirculation times. During pulping, the water temperature was maintained at 120° F. and the recirculation rate was 3000 gallons per minute. The rotor/stator clearance was 10 mils. After pulping, some of the samples were then supplied to a series of three deflakers. Alternatively, other samples were supplied to a Claflin refiner from Bolton-Emerson. Before entering the refiner, the samples were diluted to 4% consistency to prevent clogging of the refiner, which operated at a throughput of 13 gallons per minute. Each diluted sample was refined at 10 gallons per minute at a rotor/stator clearance of 5 mils.

The size distribution and Canadian Standard Freeness were measured at various stages of the process. The results are shown in FIGS. 12-16, with the following designations being assigned:

"Wypall®-40" refers to a Wypall® towel processed for a recirculation time of 40 minutes in the Tornado® pulper;

"Economizer®-40" refers to an Economizer® towel processed for a recirculation time of 40 minutes in the Tornado® pulper;

"Mix-30" refers to the mixture of Wypall®, Economizer®, and Viva® towels, processed for a recirculation time of 30 minutes in the Tornado® pulper;

"Control" refers to a towel that contained 6 wt. % latex, which was subjected to chemical treatment with hypochlorite and sodium sulfite, pulped in a conventional pulper, and then supplied to three deflakers;

"Mix-60+Def" refers to the mixture of Wypall®, Economizer®, and Viva® towels, processed for a recirculation time of 60 minutes in the Tornado® pulper and then supplied to three deflakers;

"Wypall-15+Cl" refers to a Wypall® towel processed for a recirculation time of 15 minutes in the Tornado® pulper and then supplied to a Claflin refiner;

"Economizer-15+Cl" refers to an Economizer® towel processed for a recirculation time of 15 minutes in the Tornado® pulper and then supplied to a Claflin refiner; and "Mix-15+Cl" refers to the mixture of Wypall®, Economizer®, and Viva® towels, processed for a recirculation time of 15 minutes in the Tornado® pulper and then supplied to a Claflin refiner.

Figure 16:
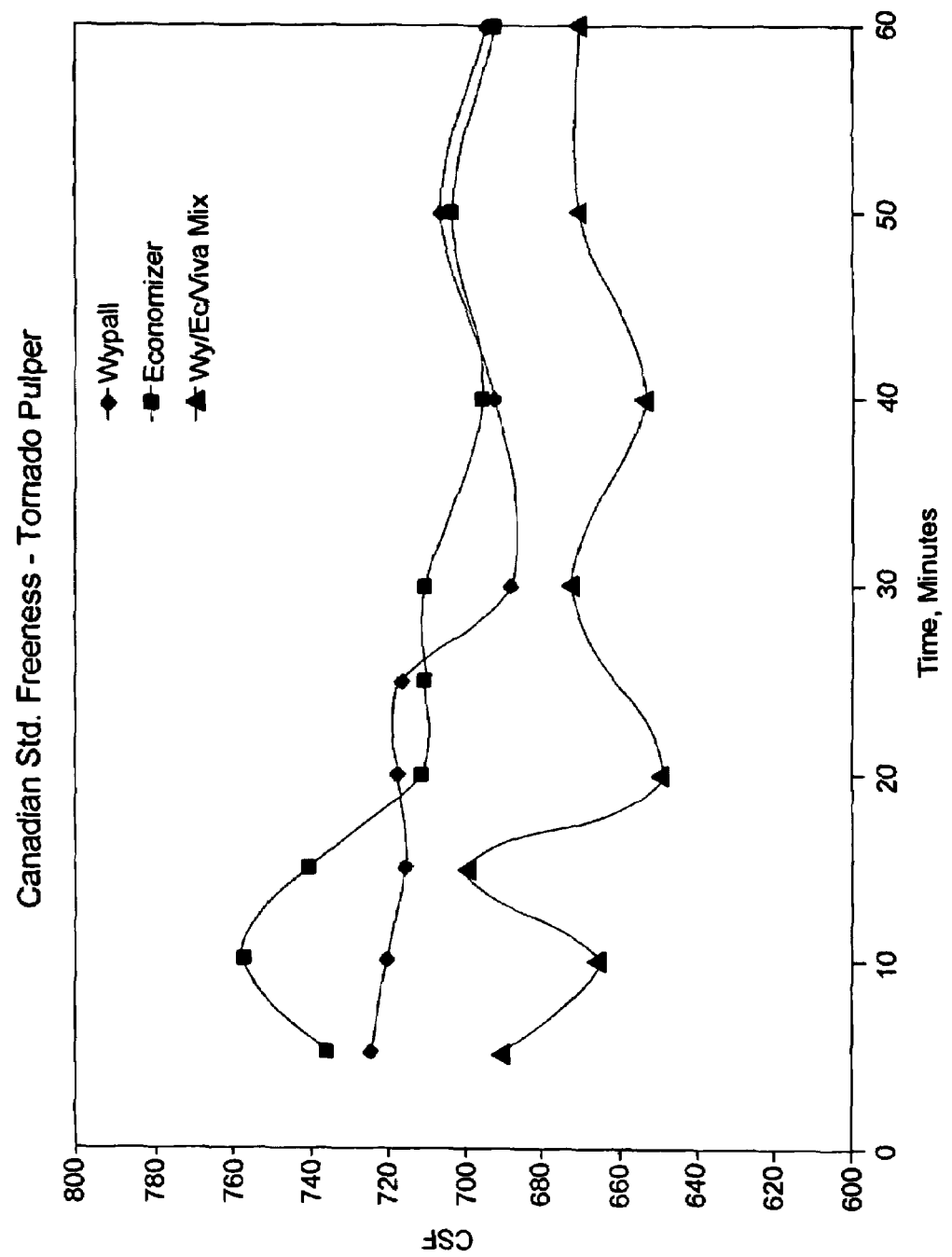
FIG. 16 is a graphical depiction of Canadian Standard Freeness (CSF) as a function of recirculation times for the pulper.

As shown in FIGS. 12-15, a high percentage of aggregates remained on the 10-mesh screen after mechanical treatment. FIG. 16 illustrates the affect of pulping on Canadian Standard Freeness as a function of time. As indicated, Canadian Standard Freeness was generally reduced after longer (pulping) times, and typically remained less than about 750.

After processing, some of the pulped/deflaked broke was incorporated into the center layer of a three-layered paper web formed in a manner described above and shown in FIGS. 1-2. The broke constituted 20 wt. % of the center layer, the balance being formed from northern softwood kraft fibers. The outer layers contained northern softwood kraft fibers. The basis weight of the resulting paper web was approximately 65 grams per square meter.

EXAMPLE 3

The ability to recycle a latex-treated paper product in accordance with the present invention was demonstrated. Various samples were formed that contained approximately 95 wt. % Wypall® towels and 5 wt. % cores. The Wypall® towels were made as described above and shown in FIGS. 1-2. The towels were formed from northern softwood kraft pulp fibers. The basis weight of the Wypall® towels were about 82 grams per square meter. The towels contained from about 10-20 wt. % of an ethylene/vinyl acetate latex co polymer.

The broke mixture was diluted with water to a solid consistency of 6% and supplied to a Tornado® pulper from Bolton-Emerson, Inc. of Lawrence, Mass. During pulping, the water temperature was maintained at 120° F. and the recirculation rate was 3000 gallons per minute. The rotor/stator clearance was 10 mils. After pulping, the samples were then supplied to a Claflin refiner from Bolton-Emerson. Before entering the refiner, the samples were diluted to 4% consistency to prevent clogging of the refiner, which operated at a throughput of 13 gallons per minute. Each diluted sample was refined at 10 gallons per minute at a rotor/stator clearance of 5 mils.

After processing, the broke was incorporated into the center layer of a three-layered paper web formed in a manner described above and shown in FIGS. 1-2. The broke constituted 40 wt. % of the center layer, the balance being formed from northern softwood kraft fibers. The outer layers contained northern softwood kraft fibers. The basis weight of the resulting paper web was about 82 grams per square meter. Once formed, the water capacity, handfeel rating, cross-direction wet tensile strength, and peel strength were determined. The results were compared to that of a Wypall® paper towel, which other than not containing broke, was made in the same manner as the paper web described above. The results are shown below in Table 3.

TABLE 3

| | Physical Properties | | |
|---|---|---|---|
| | Water Capacity (gm/gm) | CD Wet Tensile Strength (gm/3 inches) | Peel Strength (gm/inch) |
| Wypall ® | 5.8 | 2200 | 30 |
| Broke-Based Web | 6.3 | 2225 | 72 |

Thus, as indicated above, the addition of broke can result in an improvement in water capacity and peel strength. An expert panel also determined that the two products possessed approximately the same handfeel rating.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method comprising mechanically treating broke generated from scrap material accumulated during the production of paper products containing cellulosic fibers and a latex polymer to form fiber aggregates, wherein said latex polymer is present in said broke from about 1% to about 60% by weight, wherein said latex polymer is an adhesive latex, wherein said fiber aggregates have an average size of from about 0.5 to about 6 millimeters, wherein a first portion of said fiber aggregates are coated with said latex polymer and a second portion of said fiber aggregates remain relatively free from said latex polymer, wherein said mechanical treatment comprises pulping said broke in a pulper; and forming a paper product that contains said fiber aggregates, wherein said paper product comprises a multi-layered paper web.

2. A method as defined in claim 1, wherein said fiber aggregates have an average size of from about 1 to about 4 millimeters.

3. A method as defined in claim 1, wherein said fiber aggregates have a Canadian Standard Freeness value of from about 400 to about 800.

4. A method as defined in claim 1, wherein said fiber aggregates have a Canadian Standard Freeness value of from about 600 to about 750.

5. A method as defined in claim 1, wherein said second portion constitutes 40% or more of the total area of said fiber aggregates.

6. A method as defined in claim 1, wherein said second portion constitutes 50% or more of the total area of said fiber aggregates.

7. A method as defined in claim 1, wherein said second portion constitutes 60% or more of the total area of said fiber aggregates.

8. A method as defined in claim 1, wherein said broke is diluted to a solids consistency of from about 4% to about 10% prior to said pulping.

9. A method as defined in claim 1, wherein said broke is diluted to a solids consistency of from about 6% to about 8% prior to said pulping.

10. A method as defined in claim 1, wherein said pulper is a rotor/stator type pulper.

11. A method as defined in claim 1, wherein said broke is derived from a product that comprises a multi-layered paper web.

12. A method as defined in claim 11, wherein at least one surface of said product contains said latex polymer in a spaced-apart pattern.

13. A method as defined in claim 12, wherein said latex polymer covers from about 10% to about 70% of said surface.

14. A method as defined in claim 12, wherein said latex polymer covers from about 25% to about 50% of said surface.

15. A method as defined in claim 12, wherein said surface is creped.

16. A method as defined in claim 1, wherein said latex polymer comprises from about 10% to about 40% by weight of said broke.

17. A method as defined in claim 1, wherein said fiber aggregates are incorporated into an inner layer of said multi-layered paper web.

18. A method as defined in claim 17, wherein said fiber aggregates constitute less than about 60% by weight of said inner layer.

19. A method as defined in claim 17, wherein said fiber aggregates constitute from about 10% to about 50% by weight of said inner layer.

20. A method as defined in claim 1, wherein said latex polymer is selected from the group consisting of styrene butadiene, neoprene, polyvinyl chloride, vinyl copolymers, polyamides, ethylene vinyl terpolymers, acrylates, methacrylates, and combinations thereof.

21. A method comprising:

diluting broke to a solids consistency of from about 4% to about 10%, wherein the broke is generated from scrap material accumulated during the production of paper products and contains cellulosic fibers and a latex polymer selected from the group consisting of styrene butadiene, neoprene, polyvinyl chloride, vinyl copolymers, polyamides, ethylene vinyl terpolymers, acrylates, methacrylates, and combinations thereof, wherein said latex polymer is present in said broke from about 1% to about 60% by weight;

pulping said diluted broke;

thereafter refining said broke, wherein said pulping and said refining result in fiber aggregates having an average size of from about 0.5 to about 6 millimeters, and wherein a first portion of said fiber aggregates are coated with said latex polymer and a second portion of said fiber aggregates remain relatively free from said latex polymers, and forming a paper product that contains said fiber aggregates, wherein said paper product comprises a multi-layered paper web.

22. A method as defined in claim 21, wherein said fiber aggregates have an average size of from about 1 to about 4 millimeters.

23. A method as defined in claim 21, wherein said second portion constitutes 40% or more of the total area of said fiber aggregates.

24. A method as defined in claim 21, wherein said second portion constitutes 60% or more of the total area of said fiber aggregates.

25. A method as defined in claim 21, wherein said broke is diluted to a solids consistency of from about 6% to about 8% prior to said pulping.

26. A method as defined in claim 21, wherein said broke is derived from a product comprising a multi-layered paper web, said product having a surface on which said latex polymer is disposed in a spaced-apart pattern.

27. A method as defined in claim 21, wherein said latex polymer comprises from about 10% to about 40% by weight of said broke.

28. A method comprising mechanically treating broke generated from scrap material accumulated during the production of paper products containing cellulosic fibers and a latex polymer to form fiber aggregates, wherein said latex polymer is present in said broke from about 1% to about 60% by weight, wherein said latex polymer is an adhesive latex polymer, wherein said fiber aggregates have an average size of from about 0.2 to about 12 millimeters and a Canadian Standard Freeness value of from about 400 to about 800, and wherein a first portion of said fiber aggregates are coated with said latex polymer and a second portion of said fiber aggregates remain relatively free from said latex polymer, and forming a paper product that contains said fiber aggregates, wherein said paper product comprises a multi-layered paper web.

29. A method as defined in claim 28, wherein said fiber aggregates have an average size of from about 0.5 to about 6 millimeters.

30. A method as defined in claim 28, wherein said fiber aggregates have an average size of from about 1 to about 4 millimeters.

31. A method as defined in claim 28, wherein said fiber aggregates have a Canadian Standard Freeness value of from about 600 to about 750.

32. A method as defined in claim 28, wherein said second portion constitutes 40% or more of the total area of said fiber aggregates.

33. A method as defined in claim 28, wherein said second portion constitutes 60% or more of the total area of said fiber aggregates.

34. A method as defined in claim 28, wherein said mechanical treatment comprises pulping said broke in a pulper.

35. A method as defined in claim 34, wherein said broke is diluted to a solids consistency of from about 4% to about 10% prior to said pulping.

36. A method as defined in claim 34, wherein said pulper is a rotor/stator type pulper.

37. A method as defined in claim 34, wherein said mechanical treatment further comprises refining said broke.

38. A method as defined in claim 28, wherein said broke is derived from a product that comprises a multi-layered paper web.

39. A method as defined in claim 38, wherein at least one surface of said product contains said latex polymer in a spaced-apart pattern.

40. A method as defined in claim 39, wherein said surface is creped.

41. A method as defined in claim 28, wherein said latex polymer comprises from about 10% to about 40% by weight of said broke.

42. A method as defined in claim 28, wherein said fiber aggregates are incorporated into an inner layer of said multi-layered paper web.

* * * * *